(12) United States Patent
Huang

(10) Patent No.: US 9,753,254 B2
(45) Date of Patent: Sep. 5, 2017

(54) IMAGING LENS ASSEMBLY, IMAGE CAPTURING DEVICE, AND ELECTRONIC DEVICE

(71) Applicant: Largan Precision Co., Ltd., Taichung (TW)

(72) Inventor: Hsin-Hsuan Huang, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 134 days.

(21) Appl. No.: 14/812,304

(22) Filed: Jul. 29, 2015

(65) Prior Publication Data

US 2016/0291288 A1    Oct. 6, 2016

(30) Foreign Application Priority Data

Mar. 31, 2015 (TW) .............................. 104110461 A

(51) Int. Cl.
| | | |
|---|---|---|
| G02B 13/18 | (2006.01) | |
| G02B 3/02 | (2006.01) | |
| G02B 13/00 | (2006.01) | |
| G02B 9/34 | (2006.01) | |

(52) U.S. Cl.
CPC ............. *G02B 13/004* (2013.01); *G02B 9/34* (2013.01)

(58) Field of Classification Search
CPC ................................ G02B 13/004; G02B 9/34
USPC ......................................................... 359/715
See application file for complete search history.

(56) References Cited

U.S. PATENT DOCUMENTS

| | | | |
|---|---|---|---|
| 4,124,276 A | 11/1978 | Okano et al. | |
| 4,449,794 A | 5/1984 | Yamada | |
| 2013/0208365 A1* | 8/2013 | Hsu ....................... | G02B 13/02 359/715 |

FOREIGN PATENT DOCUMENTS

| | | |
|---|---|---|
| JP | S5238218 A | 3/1977 |
| JP | S5334552 A | 3/1978 |
| JP | H03172812 A | 7/1991 |
| JP | 2005265950 A | 9/2005 |
| JP | 2007017984 A | 1/2007 |
| JP | 2007212878 A | 8/2007 |

* cited by examiner

*Primary Examiner* — Alicia M Harrington
(74) *Attorney, Agent, or Firm* — Chun-Ming Shih; HDLS IPR SERVICES

(57) ABSTRACT

An imaging lens assembly includes, in order from an object side to an image side, a first lens element (100), a second lens element (120), a third lens element (130), and a fourth lens element (140). The first lens element (110) with positive refractive power has an object-side surface (111) being convex. The second lens element (120) with negative refractive power has an object-side surface (121) being concave. The third lens element (130) with positive refractive power has an object-side surface (131) and an image-side surface (132) being both aspheric. The fourth lens element (140) with refractive power has an object-side surface (141) and an image-side surface (142) being aspheric.

29 Claims, 12 Drawing Sheets

US 9,753,254 B2

IMAGING LENS ASSEMBLY, IMAGE CAPTURING DEVICE, AND ELECTRONIC DEVICE

BACKGROUND OF THE INVENTION

Field of the Invention

The present disclosure relates to an imaging lens assembly and an image capturing device. More particularly, the present disclosure relates to a compact imaging lens assembly and image capturing device applicable to electronic devices.

Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

The currently portable electronic device having optical system has effects of short object distance and wide-angle. However, the image quality of photo taking at distance range from tiny objects is poor. Moreover, conventional optical system for telephoto adapts multi-piece lens structure. The lens elements of the optical system are made of glass material, and surfaces of each lens element are spherical. Thus the optical system is expensive, bulky, difficult to carry, and cannot satisfy the requirements of convenient and multi-function specifications.

SUMMARY OF THE INVENTION

According to one aspect of the present disclosure, an imaging lens assembly includes, in order from an object side to an image side, a first lens element, a second lens element, a third lens element, and a fourth lens element. The first lens element with positive refractive power has an object-side surface being convex in a paraxial region thereof. The second lens element with negative refractive power has an object-side surface being concave in a paraxial region thereof. The third lens element with positive refractive power has an object-side surface and an image-side surface being aspheric. The fourth lens element with refractive power has an object-side surface and an image-side surface being aspheric. The imaging lens assembly further includes a stop, wherein no lens element with refractive power is disposed between the stop and the first lens element. The imaging lens assembly has a total of four lens elements with refractive power. When a curvature radius of the object-side surface of the second lens element is R3, a curvature radius of an image-side surface of the second lens element is R4, a focal length of the imaging lens assembly is f, a maximum image height of the imaging lens assembly is ImgH, an axial distance between the first lens element and the second lens element is T12, an axial distance between the second lens element and the third lens element is T23, a central thickness of the second lens element is CT2, the following conditions are satisfied:

$(R3+R4)/(R3-R4)<0;$ $2.4<f/ImgH<6.5;$ $-4.0<R3/T23<0;$ and $0.3<T12/CT2<5.0.$

According to another aspect of the present disclosure, an imaging lens assembly includes, in order from an object side to an image side, a first lens element, a second lens element, a third lens element, and a fourth lens element. The first lens element with positive refractive power has an object-side surface being convex in a paraxial region thereof. The second lens element with negative refractive power has an object-side surface being concave in a paraxial region thereof. The third lens element with positive refractive power has an object-side surface and an image-side surface being aspheric. The fourth lens element with negative refractive power has an object-side surface and an image-side surface being aspheric. The imaging lens assembly further includes a stop, wherein no lens element with refractive power is disposed between the stop and the first lens element. The imaging lens element has a total of four lens elements with refractive power, and there is an air gap between every two of the first lens element, the second lens element, the third lens element, and the fourth lens element that are adjacent to each other. When a curvature radius of the object-side surface of the first lens element is R1, a curvature radius of an image-side surface of the first lens element is R2, a curvature radius of the object-side surface of the second lens element is R3, a curvature radius of an image side surface of the second lens element is R4, a focal length of the imaging lens assembly is f, a maximum image height of the imaging lens assembly is ImgH, and a central thickness of the first lens element is CT1, the following conditions are satisfied:

$(R3+R4)/(R3-R4)<0;$ $2.4<f/ImgH<6.5;$ $-0.50<R1/R2<0.50;$ and $3.0<(f/R1)-(f/R2)+((f*CT1)/(R1*R2))<7.5.$ According to further another aspect of the present disclosure, an image capturing device includes the imaging lens assembly according to the aforementioned aspect and an image sensor, wherein the image sensor is located at an image surface of the imaging lens assembly.

According to yet another aspect of the present disclosure, an electronic device includes the image capturing device according to the aforementioned aspect.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
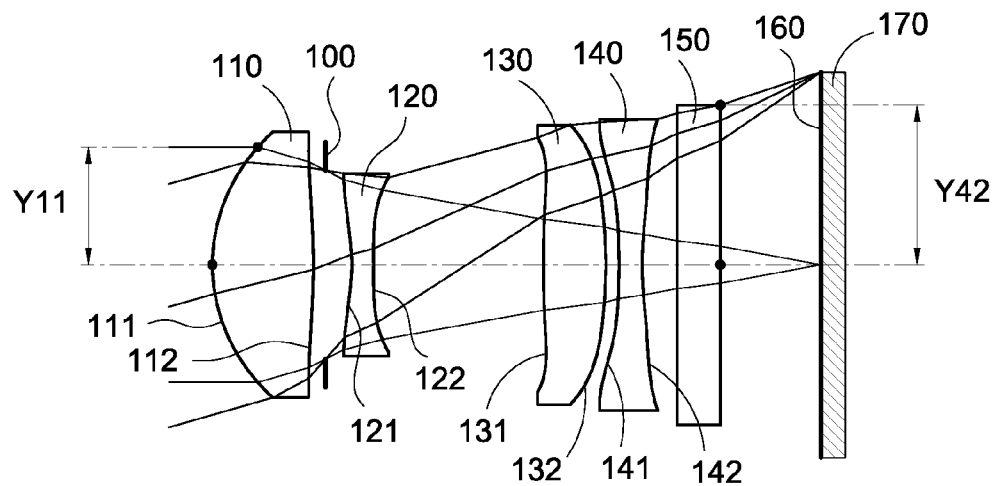
FIG. 1 is a schematic view of an image capturing device according to the 1st embodiment of the present disclosure.

An imaging lens assembly includes, in order from an object side to an image side, a first lens element, a second lens element, a third lens element, and a fourth lens element. The imaging lens assembly has a total of four lens elements with refractive power, and at least one inflection point is positioned on at least one surface of the second lens element, the third lens element, or the fourth lens element, so that the off-axis aberration can be corrected.

The first lens element with positive refractive power has an object-side surface being convex in a paraxial region thereof, which makes the imaging lens assembly more compact and portable.

The second lens with negative refractive power has an object-side surface being concave in a paraxial region thereof. Therefore, the aberration generated by the first lens element can be corrected. Moreover, the second lens element can have at least one convex shape on the object-side surface in an off-axis region thereof, and an image-side surface of the second lens element can be convex in a paraxial region, so that the astigmatism of the imaging lens assembly can be corrected.

The third lens element with positive refractive power has an object-side surface and an image-side surface being both aspheric. The object-side surface of the third lens element can be convex or concave in a paraxial region thereof for collaborating with the disposition of the whole system, thus the aberration of the imaging lens assembly can be further corrected.

The fourth lens element with negative refractive power has an object-side surface and an image-side surface being both aspheric. The object-side surface of the fourth lens element can be concave or convex in a paraxial region thereof. The image-side surface of the fourth lens element can be concave in a paraxial region thereof, and the fourth lens element can have at least one convex shape on the image-side surface in an off-axis region thereof. Therefore, the aberration of the imaging lens assembly can be effectively corrected.

In the imaging lens assembly of the present disclosure, the largest distance between every two adjacent lens elements among all the lens elements with refractive power can be a distance between the second lens element and the third lens element or a distance between the third lens element and the fourth lens element.

The imaging lens assembly further includes an aperture stop, and no lens element with refractive power is disposed between the aperture stop and the first lens element. The aperture stop is for providing sufficient light transmitting through the imaging lens assembly and thereby improving the image resolution.

According to the imaging lens assembly of the present disclosure, there is an air gap between every two of the first lens element, the second lens element, the third lens element, and the fourth lens element that are adjacent to each other. In the other words, the first lens element, the second lens element, the third lens element, and the fourth lens element are four independent and non-cemented lens elements. The manufacturing process of the cemented lenses is more complex than that of the non-cemented lenses. In particular, a second surface of one lens element and a first surface of the following lens element need to have accurate curvature to ensure these two lens elements will be highly cemented. However, during the cementing process, those two lens elements might not be highly cemented due to displacement and it is thereby not favorable for the image quality of the imaging lens assembly. Therefore, according to the imaging lens assembly of the present disclosure, the first to fourth lens elements are independent and non-cemented lens element improves the problem generated by the cemented lens elements.

When a curvature radius of the object-side surface of the second lens element is R3, and a curvature radius of the image-side surface of the second lens element is R4, the following condition is satisfied: $(R3+R4)/(R3-R4)<0$, which avoids excessive photosensitive and low manufacture yield rate since excessive curvature radius of the object-side surface of the second lens element.

When a focal length of the imaging lens assembly is f, and a maximum image height of the imaging lens assembly is ImgH, the following condition is satisfies: $2.4<f/ImgH<6.5$. Therefore, image range of the imaging lens assembly can be effectively suppressed for obtaining a higher resolving power of local image. Preferably, the following condition is satisfied: $2.7<f/ImgH<5.0$.

When the curvature radius of the object-side surface of the second lens element is R3, and an axial distance between the second lens element and the third lens element is T23, the following condition is satisfied: −4.0<R3/T23<0. Therefore, a principle point of the second lens element can be positioned close to the object side surface of the imaging lens assembly, and the optical trace between the second lens element and the third lens element can be alleviated.

When an axial distance between the first lens element and the second lens element is T12, and a central thickness of the second lens element is CT2, the following condition is satisfied: 0.3<T12/CT2<5.0. Therefore, the space allocation between the first lens element and the second lens element is sufficient for assembling and manufacturing the imaging lens assembly. Preferably, the following condition is satisfied: 0.4<T12/CT2<3.0.

When a curvature radius of the object-side surface of the first lens element is R1, and a curvature radius of an image-side surface of the first lens element is R2, the following condition is satisfied: −0.50<R1/R2<0.50. Therefore, a principle point of the first lens element can be positioned close to the object side surface of the imaging lens assembly, and the back focal length of the imaging lens assembly can be adjusted for reducing the total tract length of the imaging lens assembly. Preferably, the following condition is satisfied: −0.30<R1/R2<0.30.

When the focal length of the imaging lens assembly is f, the curvature radius of the object-side surface of the first lens element is R1, the curvature radius of the image-side surface of the first lens element is R2, and a central thickness of the first lens element is CT1, the following condition is satisfied: 3.0<(f/R1)−(f/R2)+((f*CT1)/(R1*R2))<7.5. Therefore, convergence of the imaging lens assembly centers on the object side of the imaging lens assembly for improving telescopic ability to meet the demand of telephoto.

When the curvature radius of the object-side surface of the second lens element is R3, and the curvature radius of the image-side surface of the second lens element is R4, the following condition is satisfied: |R3|<|R4|, which are favorable for assembling and manufacturing the second lens element.

When a maximum refractive index among the first lens element, the second lens element, the third lens element, and the fourth lens element is Nmax, the following condition is satisfied: 1.50<Nmax<1.70. Therefore, the aberration can be effectively reduced since the refractive power of the imaging lens assembly is balanced.

When the focal length of the imaging lens assembly is f, and the curvature radius of the object-side surface of the first lens element is R1, the following condition is satisfied: 3.3<f/R1<8.5. Therefore, the refractive power of the first lens element is proper.

When the focal length of the imaging lens assembly is f, an axial distance between the object-side surface of the first lens element and an image surface is TL, the following condition is satisfied: 0.95<f/TL<1.5. Therefore, the compact size of the imaging lens assembly is maintained since the total track of the imaging lens assembly is effectively controlled.

When the focal length of the imaging lens assembly is f, the following condition is satisfied: 5.5 mm<f<12.0 mm. Thus, the focal length of the imaging lens assembly is effectively controlled.

When the focal length of the imaging lens assembly is f, a focal length of the first lens element is f1, a focal length of the second lens element is f2, a focal length of the third lens element is f3, and a focal length of the fourth lens element is f4, the following condition is satisfied: 5.0<|f/f1|+|f/f2|+|f/f3|+|f/f4|. Therefore, the imaging lens assembly can provide a sufficient resolving power.

When a sum of central thicknesses of the first lens element, the second lens element, the third lens element, and the fourth lens element is ΣCT, and an axial distance of the object-side surface of the first lens element and the image-side surface of the fourth lens element is TD, the following condition is satisfied: ΣCT/TD<0.55. Therefore, the arrangement of the thickness of the lens elements can effectively reduce the total track length of the imaging lens assembly.

When an axial distance of the aperture stop and the image-side surface of the fourth lens element is SD, and the axial distance between the object-side surface of the first lens element and the image-side surface of the fourth lens element is TD, the following condition is satisfied: 0.65<SD/TD<1.0. Therefore, it is favorable for making a balance between telecentric characteristic and wide-viewing angle.

When a maximum entrance pupil diameter of the imaging lens assembly is EPD, and the maximum image height of the imaging lens assembly is ImgH, the following condition is satisfied: 0.9<EPD/ImgH<2.0. Therefore, image quality of the imaging lens assembly can be enhanced since the light-receiving magnitude in a unit area of image is improved.

When a half of maximum field of view of the imaging lens assembly is HFOV, the following condition is satisfied: 0.20<tan(2*HFOV)<0.90. Therefore, a sufficient field of view can be obtained.

When an Abbe number of the second lens element is V2, and an Abbe number of the third lens element is V3, the following condition is satisfied: 20<V2+V3<60. Therefore, the aberration of narrowing view angle can be corrected.

When the axial distance between the object-side surface of the first lens element and the image surface is TL, the following condition is satisfied: TL<10.0 mm.

When the axial distance between the first lens element and the second lens element is T12, the axial distance of the second lens element and the third lens element is T23, and an axial distance between the third lens element and the fourth lens element is T34, the following condition is satisfied: 0<T12/(T23+T34)<0.60. Therefore, image quality of photo taking at distance range can be enhanced since the designed axial distance between the first lens element and the second lens element.

When the central thickness of the first lens element is CT1, and the central thickness of the second lens element is CT2, the following condition is satisfied: 1.7<CT1/CT2<8.0. Therefore, the distribution of the refractive powers of the imaging lens assembly can be effectively controlled for correcting the aberration of the imaging lens assembly.

When the axial distance between the object-side surface of the first lens element and the image surface is TL, and the maximum image height of the imaging lens element is ImgH, the following condition is satisfied: 2.5<TL/ImgH<4.0. Therefore, the compact size of the imaging lens assembly is maintained and can be employed in compact electronic device.

When an effective radius of the object-side surface of the first lens element is Y11, and an effective radius of the image-side surface of the fourth lens element is Y42, the following condition is satisfied: 0.7<Y11/Y42<1.8. Therefore, an angle of incident light can be effectively controlled, and image quality can be further improved.

When the axial distance between the second lens element and the third lens element is T23, the axial distance between the third lens element and the fourth lens element is T34, and a central thickness of the third lens element is CT3, the following condition is satisfied: 2.50<(T23+T34)/CT3. Therefore, the allocation of the third lens element can be adjusted for correcting spherical aberration of the imaging lens assembly.

According to the above description of the present invention, the following 1st-14th specific embodiments are provided for further explanation.

1st Embodiment

Figure 2:
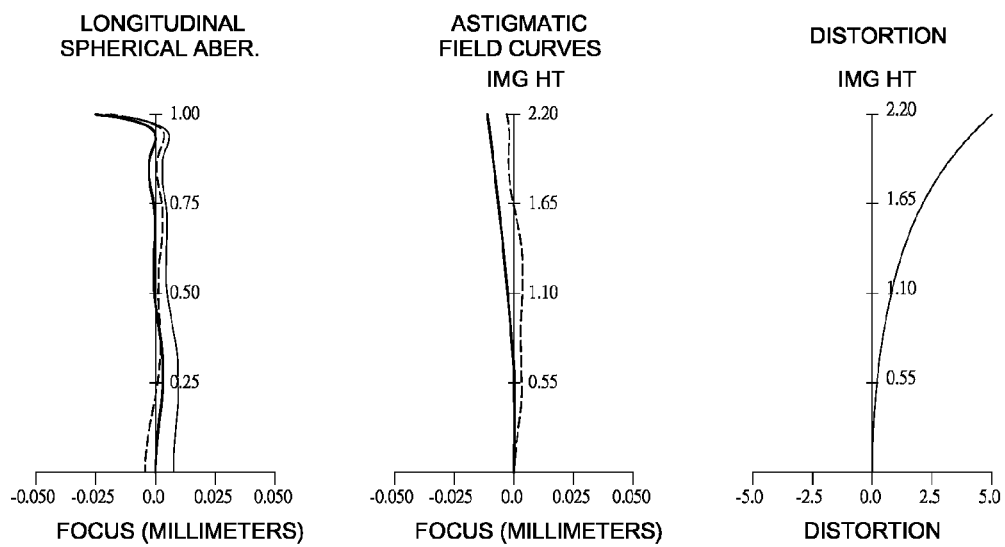
FIG. 2 shows spherical aberration curves, astigmatic field curves, and a distortion curve of the image capturing device according to the 1st embodiment.

FIG. 1 is a schematic view of an image capturing device according to 1st embodiment of the present invention. FIG. 2 shows spherical aberration curves, astigmatic field curves, and a distortion curve of the image capturing device according to the 1st embodiment. In FIG. 1, the image capturing device includes an imaging lens assembly (it reference numeral is omitted) and an image sensor 170. The imaging lens assembly includes, in order from an object side to an image side, a first lens element 110, an aperture stop 100, a second lens element 120, a third lens element 130, a fourth lens element 140, an IR-filter 150, and an image surface 160, wherein the image sensor 170 is located at the image surface 160 of the imaging lens assembly. The imaging lens assembly has a total of four lens elements with refractive power, and there is an air gap between every two of the first lens element 110, the second lens element 120, the third lens element 130, and the fourth lens element 140 that are adjacent to each other.

The first lens element 110 with positive refractive power has an object-side surface 111 being convex in a paraxial region thereof and an image-side surface 112 being convex in a paraxial region thereof. The first lens element 110 is made of plastic material and has the object-side surface 111 and the image-side surface being both aspheric.

The second lens element 120 with negative refractive power has an object-side surface 121 being concave in a paraxial region thereof and an image-side surface 122 being convex in a paraxial region thereof. The second lens element 120 is made of plastic material and has the object-side surface 121 and the image-side surface 122 being both aspheric. The object-side surface 121 of the second lens element 120 has at least one convex shape in an off-axis region thereof.

The third lens element 130 with positive refractive power has an object-side surface 131 being convex in a paraxial region thereon and an image-side surface 132 being convex in a paraxial region thereof. The third lens element 130 is made of plastic material and has the object-side surface 131 and the image-side surface 132 being both aspheric. The largest distance between every two adjacent lens elements among all the lens elements (110-140) with refractive power is a distance between the second lens element 120 and the third lens element 130.

The fourth lens element 140 with negative refractive power has an object-side surface 141 being concave in a paraxial region thereof and an image-side surface 142 being concave in a paraxial region thereof. The fourth lens element 140 is made of plastic material and has the object-side surface 141 and the image-side surface 142 being both aspheric. The image-side surface 142 of the fourth lens element 140 has at least one convex shape in an off-axis region thereof.

The IR-filter 150 is made of glass material and located between the fourth lens element 140 and the image surface 160, and will not affect a focal length of the imaging lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the imaging lens assembly according to 1st embodiment, when a focal length of the imaging lens assembly is f, a f-number of the imaging lens assembly is Fno, a half of maximum field of view of the imaging lens assembly is HFOV, these parameters are the following value: f=7.31 mm, Fno=2.70, and FHOV=16.0 degrees.

In the imaging lens assembly according to the 1st embodiment, when a maximum refractive index among the first lens element, the second lens element, the third lens element, and the fourth lens element is Nmax, the following condition is satisfied: Nmax=1.639.

In the imaging lens assembly according to 1st embodiment, when an Abbe number of the second lens element 120 is V2, and an Abbe number of the third lens element 130 is V3, the following condition is satisfied: V2+V3=47.0.

In the imaging lens assembly according to the 1st embodiment, when a central thickness of the first lens element 110 is CT1, and a central thickness of the second lens element 120 is CT2, the following condition is satisfied: CT1/CT2=4.64.

In the imaging lens assembly according to the 1st embodiment, when an axial distance between the first lens element 110 and the second lens element 120 is T12, and the central thickness of the second lens element 120 is CT2, the following condition is satisfied: T12/CT2=1.77.

In the imaging lens assembly according to the 1st embodiment, when the axial distance between the first lens element 110 and the second lens element 120 is T12, an axial distance between the second lens element 120 and the third lens element 130 is T23, and an axial distance between the third lens element 130 and the fourth lens element 140 is T34, the following condition is satisfied: T12/(T23+T34)=0.21.

In the imaging lens assembly according to the 1st embodiment, when the axial distance between the second lens element 120 and the third lens element 130 is T23, and the axial distance between the third lens element 130 and the fourth lens element 140 is T34, and a central thickness of the third lens element 130 is CT3, the following condition is satisfied: (T23+T34)/CT3=2.93.

In the imaging lens assembly according to the 1st embodiment, when a curvature radius of the object-side surface 111 of the first lens element 110 is R1, and a curvature radius of the image-side surface 112 of the first lens element 110 is R2, the following condition is satisfied: R1/R2=−0.22.

In the imaging lens assembly according to the 1st embodiment, when the object-side surface 121 of the second lens element 120 is R3, and the axial distance between the second lens element 120 and the third lens element 130 is T23, the following condition is satisfied: R3/T23=−1.04.

In the imaging lens assembly according to the 1st embodiment, when the focal length of the imaging lens assembly is f, and the curvature radius of the object-side surface 111 of the first lens element 110 is R1, the following condition is satisfied: f/R1=3.69.

In the imaging lens assembly according to the 1st embodiment, when a curvature radius of the object-side surface 121 of the second lens element 120 is R3, and the image-side surface 122 of the second lens element 120 is R4, the following condition is satisfied: (R3+R4)/(R3−R4)=−1.10.

In the imaging lens assembly according to the 1st embodiment, when the focal length of the imaging lens assembly is f, a focal length of the first lens element 110 is f1, a focal length of the second lens element 120 is f2, a focal length of the third lens element 130 is f3, and a focal length of the fourth lens element 140, the following condition is satisfied: |f/f1|+|f/f2|+|f/f3|+|f/f4|=7.29.

In the imaging lens assembly according to the 1st embodiment, when the focal length of the imaging lens assembly is f, the curvature radius of the object-side surface 111 of the first lens element 110 is R1, the curvature radius of the image-side surface 112 of the first lens element 110 is R2, and the central thickness of the first lens element 110 is CT1, the following condition is satisfied: (f/R1)−(f/R2)+((f*CT1)/(R1*R2))=4.30.

In imaging lens assembly according to the 1st embodiment, when a sum of central thicknesses of the first lens element 110, the second lens element 120, the third lens element 130, and the fourth lens element 140 is ΣCT, and an axial distance between the object-side surface 111 of the first lens element 110 and the image-side surface 142 of the fourth lens element 140 is TD, the following condition is satisfied: ΣCT/TD=0.48.

In the imaging lens assembly according to the 1st embodiment, when an effective radius of the object-side surface 111 of the first lens element 110 is Y11, and an effective radius of the image-side surface 142 of the fourth lens element 140 is Y42, the following condition is satisfied: Y11/Y42=0.91.

In the imaging lens assembly according to the 1st embodiment, when the half of maximum field of view of the imaging lens assembly is HFOV, the following condition is satisfied: tan(2*HFOV)=0.62.

In the imaging lens assembly according to the 1st embodiment, when an axial distance between the aperture stop 100 and the image-side surface 142 of the fourth lens element 140 is SD, and the axial distance between the object-side surface 111 of the first lens element 110 and the image-side surface 142 of the fourth lens element 140 is TD, the following condition is satisfied: SD/TD=0.74.

In the imaging lens assembly according to the first embodiment, when an entrance pupil diameter of the imaging lens assembly is EPD, and a maximum image height of imaging lens assembly is ImgH, the following condition is satisfied: EPD/ImgH=1.2.

In the imaging lens assembly according to the 1st embodiment, when an axial distance between the object-side surface 111 of the first lens element 110 and the image surface 160 is TL, the following condition is satisfied: TL=7.00 mm.

In the imaging lens assembly according to the 1st embodiment, when the focal length of the imaging lens assembly is f, the axial distance between the object-side 111 of the first lens element 110 and the image surface 160 is TL, the following condition is satisfied: f/TL=1.05.

In the imaging lens assembly according to the 1st embodiment, when the focal length of the imaging lens assembly is f, and the maximum image height of the imaging lens assembly is ImgH, the following condition is satisfied: f/ImgH=3.32.

In the imaging lens assembly according to the 1st embodiment, when the axial distance between the object-side surface 111 of the first lens element 110 and the image surface 160 is TL, and the maximum image height of the imaging lens assembly is ImgH, the following condition is satisfied: TL/ImgH=3.17.

The detail optical data of the 1st embodiment are shown in Table 1 and the aspheric surface data are shown in Table 2 below.

TABLE 1

1st Embodiment
f = 7.31 mm, Fno = 2.70, HFOV = 16.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.983 | ASP | 1.160 | Plastic | 1.544 | 55.9 | 3.09 |
| 2 | | −8.856 | ASP | 0.142 | | | | |
| 3 | Ape. Stop | Plano | | 0.301 | | | | |
| 4 | Lens 2 | −2.041 | ASP | 0.250 | Plastic | 1.639 | 23.5 | −3.35 |
| 5 | | −44.883 | ASP | 1.954 | | | | |
| 6 | Lens 3 | 12.682 | ASP | 0.718 | Plastic | 1.639 | 23.5 | 5.66 |
| 7 | | −4.948 | ASP | 0.149 | | | | |
| 8 | Lens 4 | −18.211 | ASP | 0.268 | Plastic | 1.544 | 55.9 | −5.03 |
| 9 | | 3.241 | | 0.400 | | | | |
| 10 | IR-filter | Plano | | 0.500 | Glass | 1.517 | 64.2 | — |
| 11 | | Plano | | 1.155 | | | | |
| 12 | Image | Plano | | — | | | | |

Note:
Reference wavelength is 587.6 nm (d-line)

TABLE 2

Aspheric Coefficients

| Surface # | 1 | 2 | 4 | 5 |
|---|---|---|---|---|
| k = | −1.5824E+00 | 3.0202E+01 | 3.5990E−02 | 9.0000E+01 |
| A4 = | 2.3141E−02 | 2.0975E−02 | 3.4051E−01 | 3.1787E−01 |
| A6 = | 6.1060E−04 | 5.1272E−03 | −3.4149E−01 | −2.7230E−01 |
| A8 = | 9.1140E−04 | −6.5661E−03 | 2.8462E−01 | 2.0605E−01 |
| A10 = | −4.2555E−04 | 3.5066E−03 | −1.5000E−01 | −8.4993E−02 |
| A12 = | 1.2551E−04 | −5.4245E−04 | 3.6297E−02 | 8.2219E−03 |
| A14 = | | | | 7.2199E−03 |

| Surface # | 6 | 7 | 8 | 9 |
|---|---|---|---|---|
| k = | 5.2196E+01 | −8.0734E+01 | 9.0000E+01 | −3.1724E+01 |
| A4 = | 7.3545E−03 | −1.9451E−02 | −1.0289E−01 | −6.7294E−02 |
| A6 = | −2.4244E−02 | −5.9541E−03 | 3.5013E−02 | 3.2905E−02 |
| A8 = | 1.0277E−02 | −5.4648E−03 | 3.9644E−03 | −8.9993E−04 |
| A10 = | −6.8006E−03 | 2.9856E−03 | −2.6975E−03 | −1.7794E−03 |
| A12 = | 1.0792E−03 | −6.2530E−04 | 2.7538E−04 | 2.6735E−04 |
| A14 = | 7.0772E−05 | 5.1479E−05 | 6.5242E−06 | 1.1511E−06 |

In Table 1, the curvature radius, the thickness, and the focal length are shown in millimeter (mm). Surface numbers 0-12 represent the surfaces sequentially arranged from the object-side to the image-side along the optical axis. In Table 2, k represents the conic coefficient of the equation of the aspheric surface profiles. A4-A14 represent the aspheric coefficients ranging from the 4th order to the 14th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
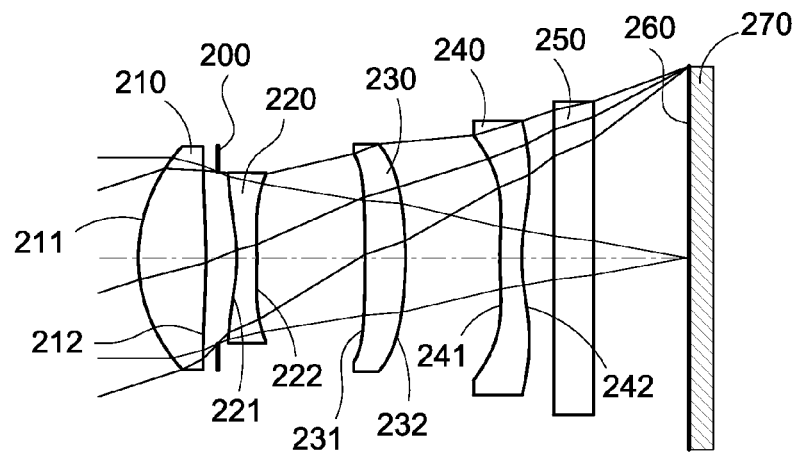
FIG. 3 is a schematic view of an image capturing device according to the 2nd embodiment of the present disclosure.
Figure 4:
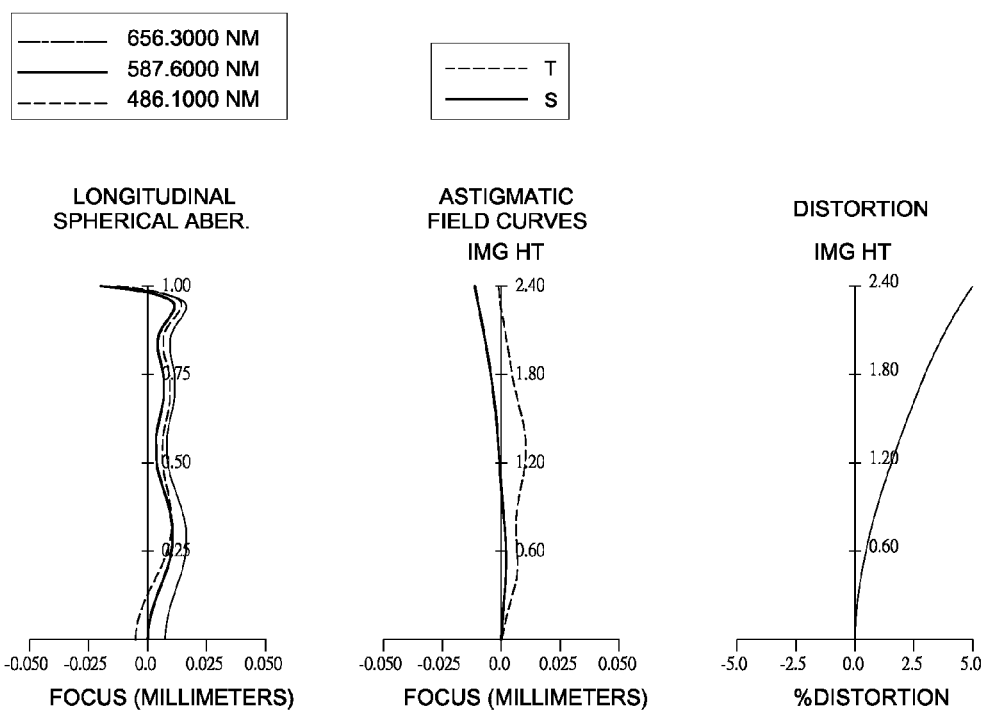
FIG. 4 shows spherical aberration curves, astigmatic field curves, and a distortion curve of the image capturing device according to the 2nd embodiment.

FIG. 3 is schematic view of an image capturing device according to 2nd embodiment of the present disclosure. FIG. 4 shows, in order from left to right, spherical aberration curves, astigmatic field curves and a distortion curve of the image capturing device according to the 2nd embodiment. In FIG. 3, the imaging capturing device includes an imaging lens assembly (its reference numeral is omitted) and an image sensor 270. The imaging lens assembly includes, in order from an object side to an image side, a first lens element 210, an aperture stop 200, a second lens element 220, a third lens element 230, a fourth lens element 240, an IR-filter 250, and an image surface 260, wherein the image sensor 270 is located at the image surface 260 of the image capturing device. The imaging lens assembly includes a total of four lens elements (210-240) with refractive power, and there an air gap between every two of the first lens element 210, the second lens element 220, the third lens element 230, and the fourth lens element 240 that are adjacent to each other.

The first lens element 210 with positive refractive power has an object-side surface 211 being convex in a paraxial region thereof and an imaging-side surface 212 being convex in a paraxial region thereof. The first lens element 210 is made of plastic material and has the object-side surface 211 and the image-side surface 212 being both aspheric.

The second lens element 220 with negative refractive power has an object-side surface 221 being concave in a paraxial region thereof and an imaging surface 222 being convex in a paraxial region thereof. The second lens element 220 is made of plastic material and has the object-side surface 221 and the image-side surface 222 being both aspheric. The object-side surface 221 of the second lens element 220 has at least one convex shape in an off-axis region thereof.

The third lens element 230 with positive refractive power has an object-side surface 231 being concave in a paraxial region thereof and an image-side surface 232 being convex in a paraxial region. The third lens element 230 is made of plastic material and has the object-side surface 231 and the image-side surface 232 being both aspheric. The largest distance between every two adjacent lens elements among all the lens elements (210-240) with refractive power is a distance between the second lens element 220 and the third lens element 230.

The forth lend element 240 with negative refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. The image-side surface 242 of the fourth lens element 240 has at least one convex shape in an off-axis region thereof.

The IR-filer 250 is made of glass material and is located between the fourth lens element 240 and the image surface 260, and will not affect a focal length of the imaging lens assembly.

The detailed optical data of the 2nd embodiment are shown in Table 3 and the aspheric surface data are shown in Table 4 below.

TABLE 3

2nd Embodiment
f = 7.03 mm, Fno = 2.80, HFOV = 18.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.055 ASP | 0.845 | Plastic | 1.544 | 55.9 | 3.22 |
| 2 | | −10.207 ASP | 0.148 | | | | |
| 3 | Ape. Stop | Plano | 0.243 | | | | |
| 4 | Lens 2 | −1.787 ASP | 0.250 | Plastic | 1.639 | 23.5 | −4.12 |
| 5 | | −5.857 ASP | 1.352 | | | | |
| 6 | Lens 3 | −19.681 ASP | 0.508 | Plastic | 1.639 | 23.5 | 9.98 |
| 7 | | −4.867 ASP | 1.182 | | | | |
| 8 | Lens 4 | 4.826 ASP | 0.272 | Plastic | 1.544 | 55.9 | −7.15 |
| 9 | | 2.111 ASP | 0.400 | | | | |

TABLE 3-continued

2nd Embodiment
f = 7.03 mm, Fno = 2.80, HFOV = 18.0 deg.

| Surface # | | Curvature Radius | Thickness | Material | Index | Abbe # | Focal Length |
|---|---|---|---|---|---|---|---|
| 10 | IR-filter | Plano | 0.500 | Glass | 1.517 | 64.2 | — |
| 11 | | Plano | 1.199 | | | | |
| 12 | Image | Plano | — | | | | |

Note:
Reference wavelength is 587.6 nm (d-line)

TABLE 4

Aspheric Coefficients

| Surface # | 1 | 2 | 4 | 5 |
|---|---|---|---|---|
| k = | −1.6497E+00 | −2.4566E+01 | −1.0148E+00 | −9.0000E+01 |
| A4 = | 2.2976E−02 | 1.7781E−02 | 3.7108E−01 | 2.8788E−01 |
| A6 = | 9.7564E−04 | 1.3317E−03 | −3.7797E−01 | −2.2844E−01 |
| A8 = | 7.0973E−04 | −2.2433E−03 | 2.9617E−01 | 1.2343E−01 |
| A10 = | 1.1924E−04 | −4.9885E−04 | −1.5239E−01 | −2.6923E−02 |
| A12 = | −6.5203E−05 | 3.3772E−04 | 3.5831E−02 | −1.1434E−02 |
| A14 = | | | | 7.2199E−03 |

| Surface # | 6 | 7 | 8 | 9 |
|---|---|---|---|---|
| k = | −9.0000E+01 | −1.0287E−01 | −9.0000E+01 | −1.2325E+01 |
| A4 = | 5.4143E−03 | −1.1080E−02 | −1.2974E−01 | −8.4553E−02 |
| A6 = | −1.9638E−02 | −8.2367E−03 | 1.9217E−02 | 1.7853E−02 |
| A8 = | 7.7725E−03 | −5.3901E−03 | 3.2823E−03 | 8.4532E−04 |
| A10 = | −2.9101E−03 | 3.3907E−03 | −2.1164E−03 | −1.2377E−03 |
| A12 = | 3.1780E−03 | −8.5369E−04 | 6.1922E−04 | 2.8770E−04 |
| A14 = | −1.4710E−03 | −8.4646E−05 | −7.6560E−05 | −2.4626E−05 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 7.03 | (R3 + R4)/(R3 − R4) | −1.88 |
| Fno | 2.80 | |f/f1| + |f/f2| + |f/f3| + |f/f4| | 5.58 |
| HFOV [deg.] | 18.0 | (f/R1) − (f/R2) + ((f*CT1)/(R1*R2)) | 3.83 |
| Nmax | 1.639 | ΣCT/TD | 0.39 |
| V2 + V3 | 47.0 | Y11/Y42 | 0.82 |
| CT1/CT2 | 3.38 | tan(2*HFOV) | 0.73 |
| T12/CT2 | 1.56 | SD/TD | 0.79 |
| T12/(T23 + T34) | 0.15 | EPD/ImgH | 1.05 |
| (T23 + T34)/CT3 | 4.99 | TL [mm] | 6.90 |
| R1/R2 | −0.20 | f/TL | 1.02 |
| R3/T23 | −1.32 | f/ImgH | 2.93 |
| f/R1 | 3.42 | TL/ImgH | 2.87 |

3rd Embodiment

Figure 5:
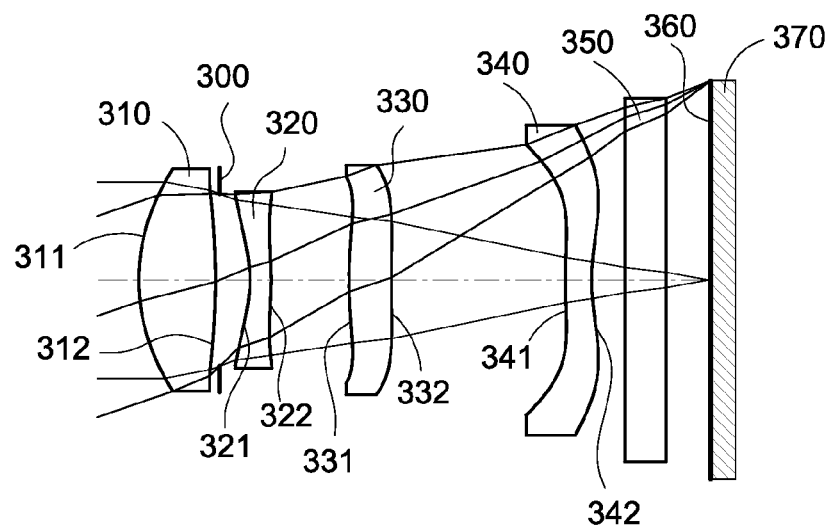
FIG. 5 is a schematic view of an image capturing device according to the 3rd embodiment of the present disclosure.
Figure 6:
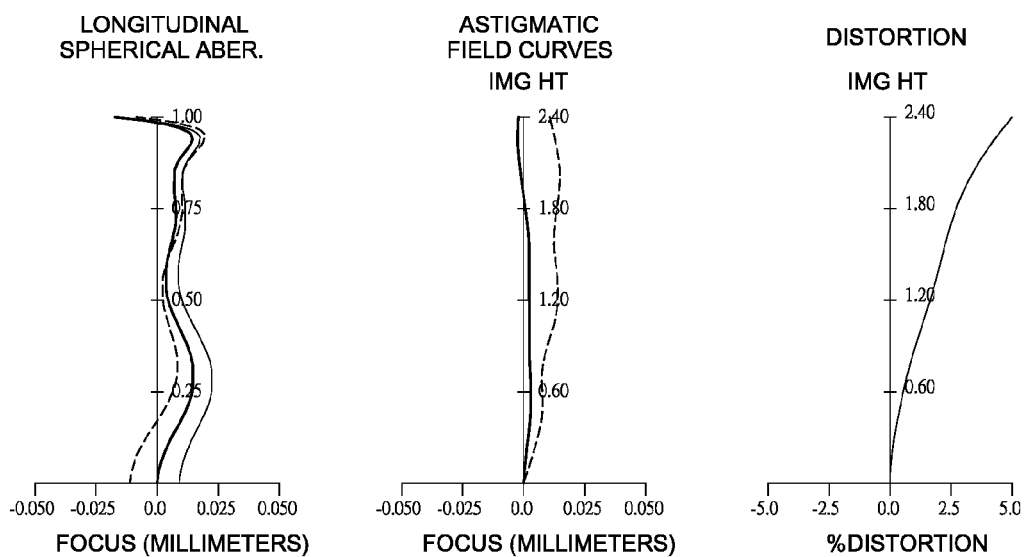
FIG. 6 shows spherical aberration curves, astigmatic field curves, and a distortion curve of the image capturing device according to the 3rd embodiment.

FIG. 5 is schematic view of an image capturing device according to 3rd embodiment of the present disclosure. FIG. 6 shows, in order from left to right, spherical aberration curves, astigmatic field curves and a distortion curve of the image capturing device according to the 2nd embodiment. In FIG. 5, the imaging capturing device includes an imaging lens assembly (its reference numeral is omitted) and an image sensor 370. The imaging lens assembly includes, in order from an object side to an image side, a first lens element 310, an aperture stop 300, a second lens element 320, a third lens element 330, a fourth lens element 340, an IR-filter 350, and an image surface 360, wherein the image sensor 370 is located at the image surface 360 of the imaging lens assembly. The imaging lens assembly includes a total of four lens elements (310-440) with refractive power, and there is an air gap between every two of the first lens element 310, the second lens element 320, the third lens element 330, and the fourth lens element 340 that are adjacent to each other.

The first lens element 310 with positive refractive power has an object-side surface 311 being convex in a paraxial region thereof and an image-side surface 312 being convex in a paraxial region thereof. The first lens element 310 is made of plastic material and the object-side surface 311 and the image-side surface 312 being both aspheric.

The second lens element 320 with negative refractive power has an object-side surface 321 being concave in a paraxial region and an image-side surface 322 being convex in a paraxial region. The second lens element 320 is made of plastic material and has the object-side surface 321 and the image-side surface 322 being both aspheric. The object-side surface 321 of the third lens element 320 has at least one convex shape in an off-axis region thereof.

The third lens element 330 with positive refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric.

The fourth lens element 340 with negative refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric. The image-side surface 342 of the fourth lens element 340 has at least one convex shape in an off-axis region thereof, and the largest distance between every two adjacent lens elements among all the lens elements (310-340) with refractive power is a distance between the third lens element 330 and the fourth lens element 340.

The IR-filter 350 is made of glass material and is located between the fourth lens element 340 and the image surface 360, and will not affect a focal length of the image lens assembly.

The detailed optical data of the 3rd embodiment are shown in Table 5 and the aspheric surface data are shown in Table 6 below.

TABLE 5

3rd Embodiment
f = 6.63 mm, Fno = 2.80, HFOV = 19.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.309 | ASP | 0.926 | Plastic | 1.544 | 55.9 | 3.39 |
| 2 | | −7.830 | ASP | 0.050 | | | | |
| 3 | Ape. Stop | Plano | | 0.368 | | | | |
| 4 | Lens 2 | −1.502 | ASP | 0.250 | Plastic | 1.639 | 23.5 | −3.94 |
| 5 | | −3.965 | ASP | 0.942 | | | | |
| 6 | Lens 3 | 4.728 | ASP | 0.514 | Plastic | 1.639 | 23.5 | 9.69 |
| 7 | | 19.153 | ASP | 2.096 | | | | |
| 8 | Lens 4 | 4.691 | ASP | 0.316 | Plastic | 1.544 | 55.9 | −8.76 |
| 9 | | 2.308 | ASP | 0.400 | | | | |
| 10 | IR-filter | Plano | | 0.500 | Glass | 1.517 | 64.2 | — |
| 11 | | Plano | | 0.537 | | | | |
| 12 | Image | Plano | | — | | | | |

Note:
Reference wavelength is 587.6 nm (d-line)

TABLE 6

Aspheric Coefficients

| Surface # | 1 | 2 | 4 | 5 |
|---|---|---|---|---|
| k = | −2.3189E+00 | −1.7629E+01 | −5.4266E−01 | −5.2645E+01 |
| A4 = | 2.1314E−02 | 1.0936E−02 | 3.5072E−01 | 1.7018E−01 |
| A6 = | 1.4089E−03 | −6.7941E−03 | −3.5741E−01 | −1.3670E−01 |
| A8 = | −5.2481E−03 | 7.6330E−03 | 3.3818E−01 | 8.1185E−02 |
| A10 = | 4.0521E−03 | −6.2883E−03 | −2.1239E−01 | −2.6833E−02 |
| A12 = | −1.2868E−03 | 1.2659E−03 | 5.9411E−02 | −7.4235E−03 |
| A14 = | | | | 7.2199E−03 |

| Surface # | 6 | 7 | 8 | 9 |
|---|---|---|---|---|
| k = | −7.3677E+00 | −9.0000E+01 | −9.0000E+01 | −1.4795E+01 |
| A4 = | −4.3495E−02 | −4.2313E−02 | −1.0346E−01 | −6.9766E−02 |
| A6 = | −1.0826E−02 | −5.0548E−03 | −7.1745E−03 | 2.5313E−05 |
| A8 = | −2.3447E−03 | −2.5175E−03 | 9.1820E−03 | 3.9498E−03 |
| A10 = | −1.0460E−03 | 3.9793E−04 | −2.3043E−03 | −8.3433E−04 |
| A12 = | −1.9758E−04 | −4.4540E−04 | 3.6738E−04 | 9.2321E−05 |
| A14 = | −5.4218E−04 | 6.5017E−05 | −1.7376E−05 | −4.2897E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

3rd Embodiment

| | | | |
|---|---|---|---|
| f [mm] | 6.63 | (R3 + R4)/(R3 − R4) | −2.22 |
| Fno | 2.80 | \|f/f1\| + \|f/f2\| + \|f/f3\| + \|f/f4\| | 5.08 |
| HFOV [deg.] | 19.0 | (f/R1) − (f/R2) + ((f*CT1)/(R1*R2)) | 3.38 |
| Nmax | 1.639 | ΣCT/TD | 0.37 |
| V2 + V3 | 47.0 | Y11/Y42 | 0.72 |
| CT1/CT2 | 3.70 | tan(2*HFOV) | 0.78 |
| T12/CT2 | 1.67 | SD/TD | 0.82 |
| T12/(T23 + T34) | 0.14 | EPD/ImgH | 0.99 |
| (T23 + T34)/CT3 | 5.91 | TL [mm] | 6.90 |

3rd Embodiment (continued)

| | | | |
|---|---|---|---|
| R1/R2 | −0.29 | f/TL | 0.96 |
| R3/T23 | −1.59 | f/ImgH | 2.76 |
| f/R1 | 2.87 | TL/ImgH | 2.87 |

4th Embodiment

Figure 7:
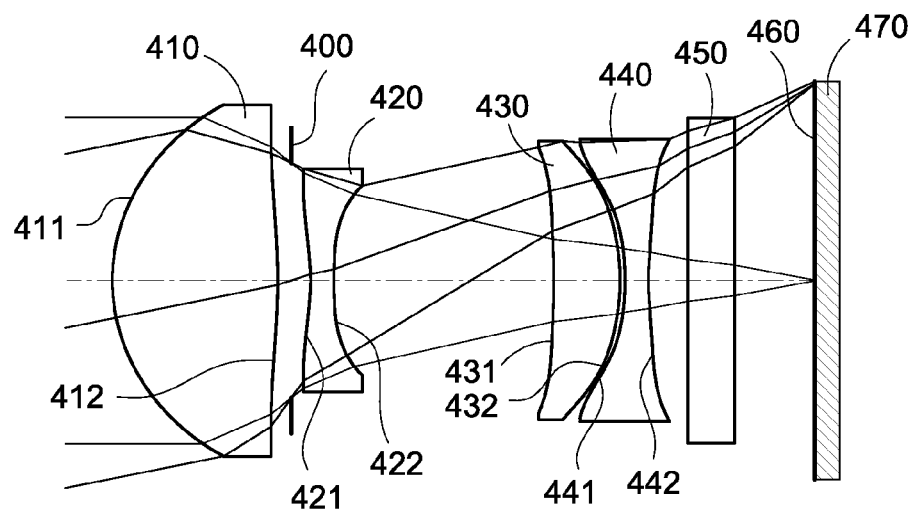
FIG. 7 is a schematic view of an image capturing device according to the 4th embodiment of the present disclosure.
Figure 8:
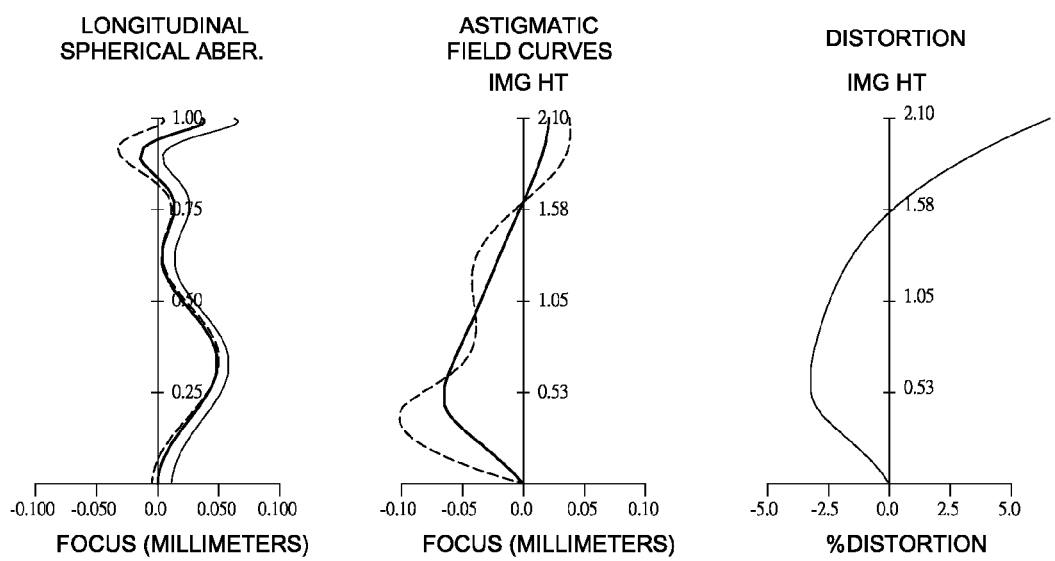
FIG. 8 shows spherical aberration curves, astigmatic field curves, and a distortion curve of the image capturing device according to the 4th embodiment.

FIG. 7 is a schematic view of an image capturing device according to 4th embodiment of the present invention. FIG. 8 shows spherical aberration curves, astigmatic field curves, and a distortion curve of the image capturing device according to the 4th embodiment. In FIG. 7, the image capturing device includes an imaging lens assembly (it reference numeral is omitted) and an image sensor 470. The imaging lens assembly includes, form an object side to an image side, a first lens element 410, an aperture stop 400, a second lens element 420, a third lens element 430, a fourth lens element 440, an IR-filter 450, and an image surface 460, wherein the image sensor 470 is located at the image surface 480 of the imaging lens assembly. The imaging lens assembly has a total of four lens elements with refractive power, and there is an air gap between every two of the first lens element 410, the second lens element 420, the third lens element 430, and the fourth lens element 440 that are adjacent to each other.

The first lens element 410 with positive refractive power has an object-side surface 411 being convex in a paraxial region thereof and an image-side surface 412 being convex in a paraxial region thereof. The first lens element 410 is made of plastic material and has the object-side surface 411 and the image-side surface 412 being both aspheric.

The second lens element 420 with negative refractive power has an object-side surface 421 being concave in a paraxial region thereof and an image-side surface 422 being concave in a paraxial region thereof. The second lens element 420 is made of plastic material and has the object-side surface 421 and the image-side surface 422 being both aspheric. The object-side surface 422 of the second lens element 420 has at least one convex shape in an off-axis region thereof.

The third lens element 430 with positive refractive power has an object-side surface 431 being concave in a paraxial region thereof and an image-side surface 432 being convex in a paraxial region thereof. The third lens element 430 is made of plastic material and has the object-side surface 431 and the image-side surface 432 being both aspheric. The largest distance between every two adjacent lens elements among all the lens elements (410-440) with refractive power is a distance between the second lens element 420 and the third lens element 430.

The fourth lens element 440 with negative refractive power has an object-side surface 441 being concave in a paraxial region thereof and the image-side surface 442 being concave in a paraxial region thereof. The fourth lens element 440 is made of plastic material and has the object-side surface 441 and the image-side surface 442 being both aspheric. The image-side surface 442 of the fourth lens element 440 has at least one convex shape in an off-axis region thereof.

The IR-filter 450 is made of glass material and is located between the fourth lens element 440 and the image surface 460, and will not affect a focal length of the imaging lens assembly.

The detailed optical data of the 4th embodiment are shown in Table 7 and the aspheric surface data are shown in Table 8 below.

TABLE 7

4th Embodiment
f = 9.76 mm, Fno = 2.80, HFOV = 11.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.949 | ASP | 1.763 | Plastic | 1.544 | 55.9 | 3.04 |
| 2 | | −7.409 | ASP | 0.147 | | | | |
| 3 | Ape. Stop | Plano | | 0.205 | | | | |
| 4 | Lens 2 | −2.194 | ASP | 0.250 | Plastic | 1.639 | 23.5 | −2.75 |
| 5 | | 9.217 | ASP | 2.345 | | | | |
| 6 | Lens 3 | −8.927 | ASP | 0.709 | Plastic | 1.639 | 23.5 | 3.86 |
| 7 | | −1.991 | ASP | 0.050 | | | | |
| 8 | Lens 4 | −3.383 | ASP | 0.250 | Plastic | 1.544 | 55.9 | −2.42 |
| 9 | | 2.218 | ASP | 0.420 | | | | |
| 10 | IR-filter | Plano | | 0.500 | Glass | 1.517 | 64.2 | — |
| 11 | | Plano | | 0.856 | | | | |
| 12 | Image | Plano | | — | | | | |

Note:
Reference wavelength is 587.6 nm (d-line)

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

5th Embodiment

Figure 9:
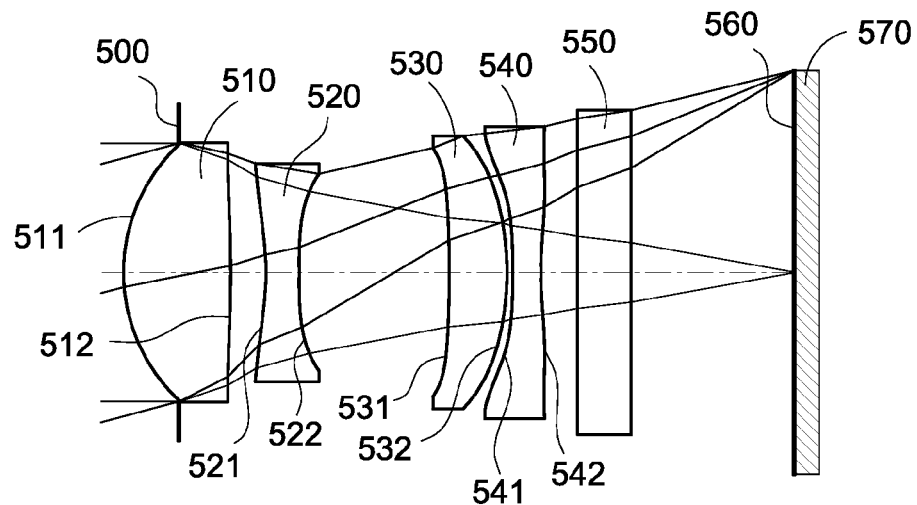
FIG. 9 is a schematic view of an image capturing device according to the 5th embodiment of the present disclosure.
Figure 10:
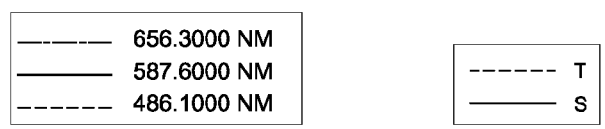
FIG. 10 shows spherical aberration curves, astigmatic field curves, and a distortion curve of the image capturing device according to the 5th embodiment.
Figure 10:
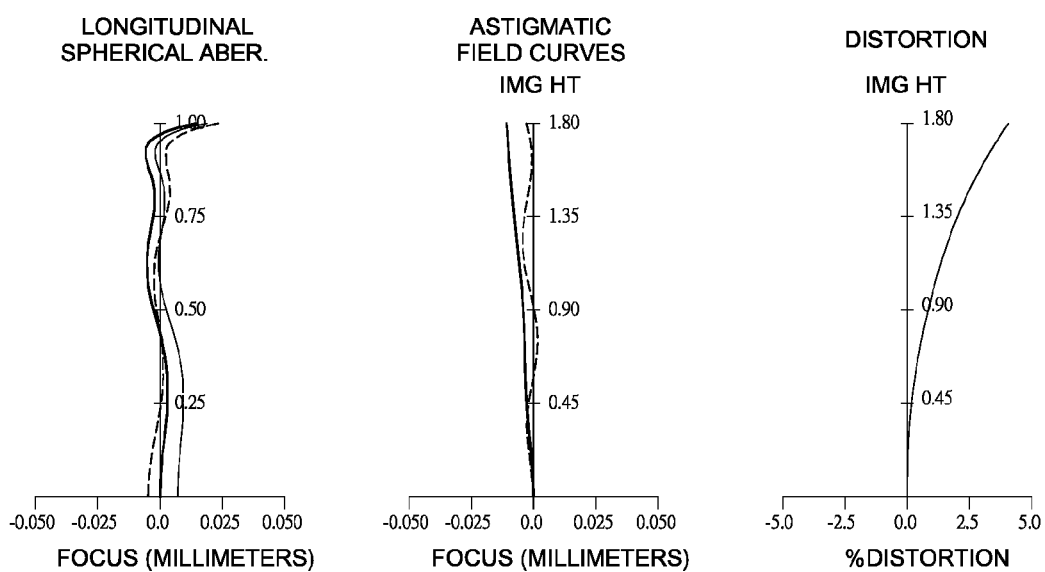

FIG. 9 is a schematic view of an image capturing device according to 5th embodiment of the present invention. FIG. 10 shows spherical aberration curves, astigmatic field curves, and a distortion curve of the image capturing device according to the 5th embodiment. In FIG. 9, the image capturing device includes an imaging lens assembly (it reference numeral is omitted) and an image sensor 570. The imaging lens assembly includes, in order from an object side to an image side, an aperture stop, a first lens element 510, a second lens element 520, a third lens element 530, a fourth lens element 540, an IR-filter 550, and an image surface 560, wherein the image sensor 570 is located at the image surface 560 of the imaging lens assembly. The imaging lens assembly has a total of four lens elements (5101-540) with refractive power, and there is an air gap between every two of the first lens element 510, the second lens element 520, the third lens element 530, and the four lens element 540 that are adjacent to each other.

The first lens element 510 with positive refractive power has an object-side surface 511 being convex in a paraxial region thereof and an image-side surface 512 being convex in a paraxial region thereof. The first lens element 510 is made of plastic material and has the object-side surface 511 and the image-side surface 512 being both aspheric.

The second lens element 520 with negative refractive power has an object-side surface 521 being concave in a paraxial region thereof and an image-side surface 522 being concave in a paraxial region thereof. The second lens element 520 is made of plastic material and has the object-side surface 521 and the image-side surface 522 being both aspheric. The object-side surface 521 of the second lens element 520 has at least one convex shape in an off-axis region thereof.

The third lens element 530 with positive refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric. The largest distance between every two adjacent lens elements among all the lens elements (510-540) with refractive power is a distance between the second lens element 520 and the third lens element 530.

The fourth lens element 540 with negative refractive power has an object-side surface 541 being concave in a paraxial region thereof and an image-side surface 542 being concave in a paraxial region thereof. The fourth lens element is made of plastic material and has the object-side surface 541 and the image-side surface 542 being both aspheric. One of the object-side surface 541 and the image-side surface 542 of the fourth lens element 540 has at least one convex shape in an off-axis region thereof.

The IR-filter 550 is made of glass material and located between the fourth lens element 550 and the image surface 560, and will not affect a focal length of the imaging lens assembly.

The detailed optical data of the 5th embodiment are shown in Table 9 and the aspheric surface data are shown in Table 10 below.

TABLE 9

5th Embodiment
f = 6.47 mm, Fno = 2.80, HFOV = 15.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.495 | | | | |
| 2 | Lens 1 | 1.569 | ASP | 0.958 | Plastic | 1.544 | 55.9 | 2.56 |
| 3 | | −9.637 | ASP | 0.317 | | | | |
| 4 | Lens 2 | −2.119 | ASP | 0.294 | Plastic | 1.639 | 23.5 | −2.80 |
| 5 | | 12.159 | ASP | 1.344 | | | | |
| 6 | Lens 3 | −9.420 | ASP | 0.517 | Plastic | 1.639 | 23.5 | 4.61 |
| 7 | | −2.291 | ASP | 0.050 | | | | |
| 8 | Lens 4 | −12.233 | ASP | 0.250 | Plastic | 1.544 | 55.9 | −4.12 |
| 9 | | 2.761 | ASP | 0.329 | | | | |
| 10 | IR-filter | Plano | | 0.480 | Glass | 1.517 | 64.2 | — |
| 11 | | Plano | | 1.453 | | | | |
| 12 | Image | Plano | | — | | | | |

Note:
Reference wavelength is 587.6 nm (d-line)

TABLE 10

Aspheric Coefficients

| Surface # | 2 | 3 | 4 | 5 |
|---|---|---|---|---|
| k = | −1.1221E+00 | −5.4636E+01 | 4.4526E−01 | 1.1238E+00 |
| A4 = | 3.4627E−02 | 2.3842E−02 | 3.3839E−01 | 3.3679E−01 |
| A6 = | 7.2741E−03 | 3.2213E−04 | −3.4703E−01 | −2.4682E−01 |
| A8 = | 1.1113E−03 | −5.1494E−03 | 2.7769E−01 | 1.8838E−01 |
| A10 = | 8.4353E−04 | 2.5889E−03 | −1.3768E−01 | −4.1481E−02 |
| A12 = | 4.1656E−04 | −7.7750E−04 | 2.8331E−02 | −5.3277E−03 |
| A14 = | | | | 2.9610E−02 |

| Surface # | 6 | 7 | 8 | 9 |
|---|---|---|---|---|
| k = | 3.2075E+01 | −1.9703E+01 | −1.2743E+01 | −3.9165E+01 |
| A4 = | 3.8734E−02 | −6.7952E−02 | −2.4126E−01 | −1.6336E−01 |
| A6 = | −6.5284E−02 | −1.9927E−02 | 9.3749E−02 | 1.1366E−01 |
| A8 = | 1.4654E−02 | −7.9869E−03 | 1.5999E−02 | −2.1476E−02 |
| A10 = | −1.6744E−02 | 7.4456E−03 | −3.7951E−03 | −4.7862E−03 |
| A12 = | −1.5571E−03 | 4.8155E−04 | −9.9451E−04 | 1.3827E−03 |
| A14 = | 2.7566E−03 | −8.4651E−04 | −1.4319E−04 | 3.0361E−04 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

5th Embodiment

| f [mm] | 6.47 | (R3 + R4)/(R3 − R4) | −0.70 |
|---|---|---|---|
| Fno | 2.80 | \|f/f1\| + \|f/f2\| + \|f/f3\| + \|f/f4\| | 7.82 |
| HFOV [deg.] | 15.0 | (f/R1) − (f/R2) + ((f*CT1)/(R1*R2)) | 4.38 |
| Nmax | 1.639 | ΣCT/TD | 0.54 |
| V2 + V3 | 47.0 | Y11/Y42 | 0.89 |
| CT1/CT2 | 3.26 | tan(2*HFOV) | 0.58 |
| T12/CT2 | 1.08 | SD/TD | 0.87 |
| T12/(T23 + T34) | 0.23 | EPD/ImgH | 1.28 |
| (T23 + T34)/CT3 | 2.70 | TL [mm] | 5.99 |
| R1/R2 | −0.16 | f/TL | 1.08 |
| R3/T23 | −1.58 | f/ImgH | 3.59 |
| f/R1 | 4.12 | TL/ImgH | 3.32 |

6th Embodiment

Figure 11:
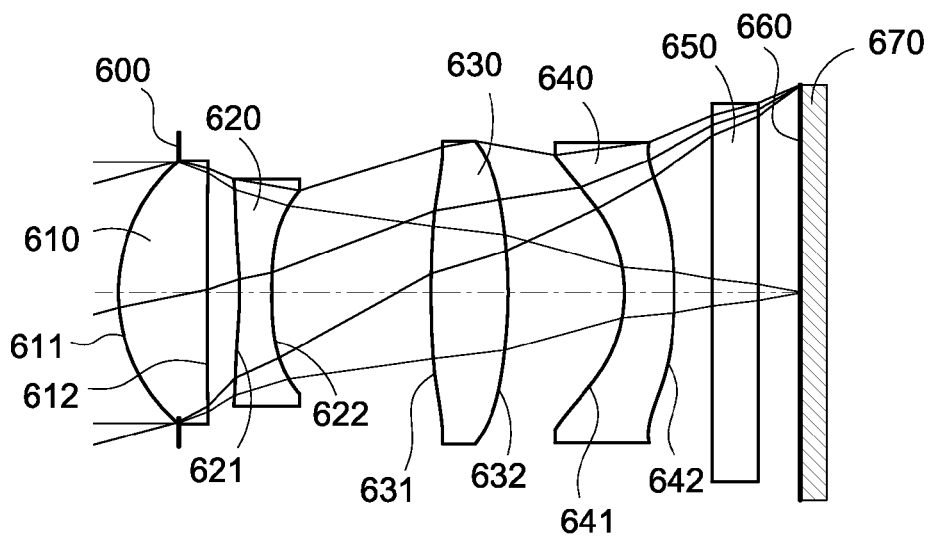
FIG. 11 is a schematic view of an image capturing device according to the 6th embodiment of the present disclosure.
Figure 12:
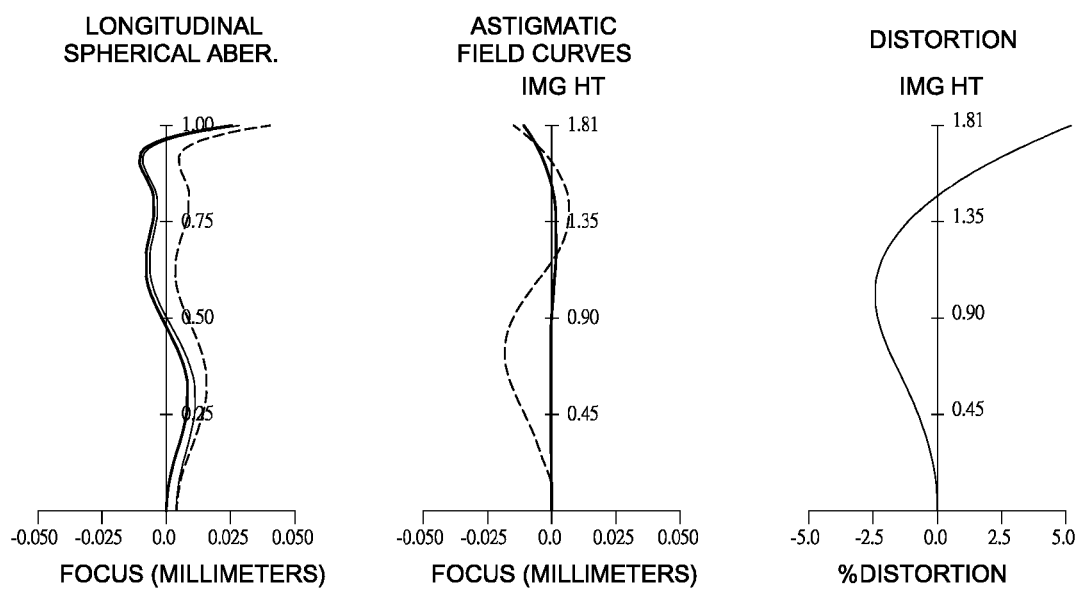
FIG. 12 shows spherical aberration curves, astigmatic field curves, and a distortion curve of the image capturing device according to the 6th embodiment.

FIG. 11 is a schematic view of an image capturing device according to 6th embodiment of the present invention. FIG. 12 shows spherical aberration curves, astigmatic field curves, and a distortion curve of the image capturing device according to the 6th embodiment. In FIG. 11, the image capturing device includes an imaging lens assembly (it reference numeral is omitted) and an image sensor 670. The imaging lens assembly includes, in order from an object side to an image side, an aperture stop 600, a first lens element 610, a second lens element 620, a third lens element 630, a fourth lens element 640, an IR-filter 650, and an image surface 660, wherein the image sensor 670 is located at the image surface 660 of the imaging lens assembly. The imaging lens assembly has a total of four lens elements (610-640) with refractive power, and there is an air gap between every two of the first lens elements 610, the second lens element 620, the third lens element 630, and the fourth lens element 640 that are adjacent to each other.

The first lens element 610 with positive refractive power has an object-side surface 611 being convex in a paraxial region thereof and an image-side surface 612 being convex in a paraxial region thereof. The first lens element 610 is made of plastic material and has the object-side surface 611 and the image-side surface 612 being both aspheric.

The second lens element 620 with negative refractive power has an object-side surface 621 being concave in a paraxial region thereof and an image-side surface 622 being concave in a paraxial region thereof. The second lens element 620 is made of plastic material and has the object-side surface 621 and the image-side surface 622 being both aspheric. The object-side surface 621 of the second lens element 620 has a convex shape in an off-axis region thereof.

The third lens element 630 with positive refractive power has an object-side surface 631 being convex in a paraxial region thereof and an image-side surface 632 being convex in a paraxial region thereof. The third lens element 630 is made of plastic and has the object-side surface 631 and the image-side surface 632 being both aspheric. The largest distance between every two adjacent lens elements among all the lens elements (610-640) with refractive power is a distance between the second lens element 620 and the third lens element 630.

The fourth lens element 640 with negative refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric.

The IR-filter 650 is made of glass material and located between the fourth lens element 640 and the image surface 660, and will not affect a foal length of the imaging lens assembly.

The detailed optical data of the 6th embodiment are shown in Table 11 and the aspheric surface data are shown in Table 12 below.

TABLE 11

6th Embodiment
f = 6.39 mm, Fno = 2.80, HFOV = 15.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.500 | | | | |
| 2 | Lens 1 | 1.516 | ASP | 0.777 | Plastic | 1.544 | 55.9 | 2.75 |
| 3 | | −88.981 | ASP | 0.284 | | | | |
| 4 | Lens 2 | −3.088 | ASP | 0.279 | Plastic | 1.639 | 23.5 | −3.10 |
| 5 | | 5.710 | ASP | 1.393 | | | | |
| 6 | Lens 3 | 14.064 | ASP | 0.673 | Plastic | 1.639 | 23.5 | 5.02 |
| 7 | | −4.082 | ASP | 1.014 | | | | |
| 8 | Lens 4 | −1.373 | ASP | 0.435 | Plastic | 1.639 | 23.5 | −2.94 |
| 9 | | −5.757 | ASP | 0.329 | | | | |
| 10 | IR-filter | Plano | | 0.400 | Glass | 1.517 | 64.2 | — |
| 11 | | Plano | | 0.374 | | | | |
| 12 | Image | Plano | | — | | | | |

Note:
Reference wavelength is 587.6 nm (d-line)

TABLE 12

Aspheric Coefficients

| Surface # | 2 | 3 | 4 | 5 |
|---|---|---|---|---|
| k = | −1.1053E+00 | 9.0000E+01 | 1.9337E+00 | 3.1639E+01 |
| A4 = | 3.5535E−02 | 4.3661E−03 | 3.2186E−01 | 3.8264E−01 |
| A6 = | 9.8694E−03 | 6.7219E−03 | −3.5539E−01 | −2.9068E−01 |
| A8 = | −1.2705E−04 | −4.1387E−03 | 2.7169E−01 | 1.8593E−01 |
| A10 = | 1.6990E−03 | 5.7355E−03 | −1.4385E−01 | −6.9527E−02 |
| A12 = | 1.9180E−03 | −3.4432E−03 | 3.0226E−02 | −2.1201E−02 |
| A14 = | | | | 3.0767E−02 |

| Surface # | 6 | 7 | 8 | 9 |
|---|---|---|---|---|
| k = | 7.5196E+01 | −8.5008E+00 | −1.5317E+00 | 7.0704E+00 |
| A4 = | 7.2609E−02 | 1.9171E−02 | −2.3156E−01 | −1.9246E−01 |
| A6 = | −4.5937E−02 | −1.7054E−02 | 1.0338E−01 | 1.2669E−01 |
| A8 = | 2.1846E−02 | −1.6971E−02 | 2.1037E−02 | −2.2055E−02 |
| A10 = | −1.3710E−02 | 4.0479E−03 | −3.4804E−03 | 2.0002E−03 |
| A12 = | −1.1498E−03 | 5.3699E−04 | −1.6737E−03 | 3.1389E−03 |
| A14 = | 1.9510E−03 | 1.1367E−04 | −6.6563E−04 | −1.0014E−03 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 6.39 | (R3 + R4)/(R3 − R4) | −0.30 |
| Fno | 2.80 | \|f/f1\| + \|f/f2\| + \|f/f3\| + \|f/f4\| | 7.84 |
| HFOV [deg.] | 15.0 | (f/R1) − (f/R2) + ((f*CT1)/(R1*R2)) | 4.25 |
| Nmax | 1.639 | ΣCT/TD | 0.45 |
| V2 + V3 | 47.0 | Y11/Y42 | 0.87 |
| CT1/CT2 | 2.78 | tan(2*HFOV) | 0.58 |
| T12/CT2 | 1.02 | SD/TD | 0.90 |
| T12/(T23 + T34) | 0.12 | EPD/ImgH | 1.27 |
| (T23 + T34)/CT3 | 3.58 | TL [mm] | 5.96 |

-continued

| 6th Embodiment | | | |
|---|---|---|---|
| R1/R2 | −0.02 | f/TL | 1.07 |
| R3/T23 | −2.22 | f/ImgH | 3.54 |
| f/R1 | 4.22 | TL/ImgH | 3.30 |

7th Embodiment

Figure 13:
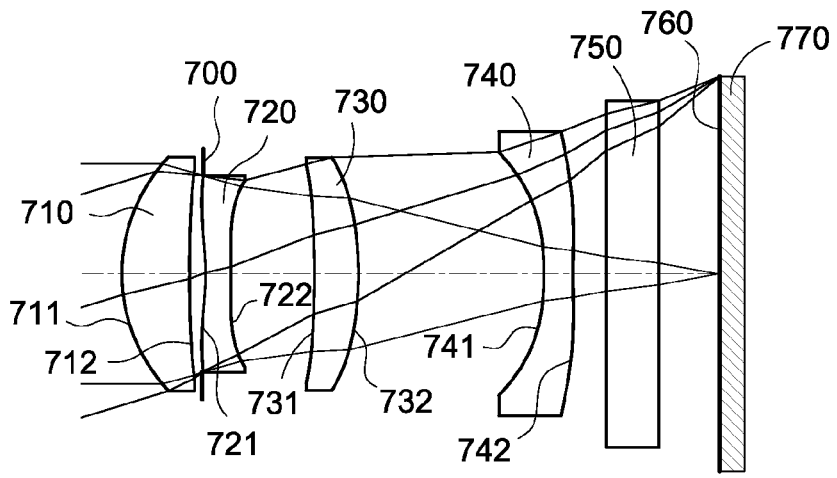
FIG. 13 is a schematic view of an image capturing device according to the 7th embodiment of the present disclosure.
Figure 14:
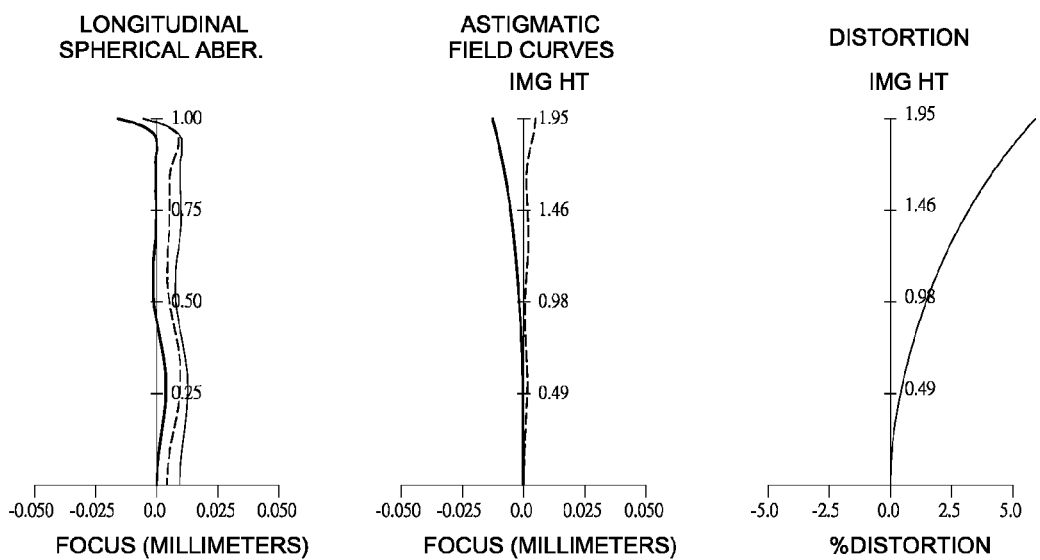
FIG. 14 shows spherical aberration curves, astigmatic field curves, and a distortion curve of the image capturing device according to the 7th embodiment.

FIG. 13 is a schematic view of an image capturing device according to 7th embodiment of the present invention. FIG. 14 shows spherical aberration curves, astigmatic field curves, and a distortion curve of the image capturing device according to the 7th embodiment. In FIG. 13, the image capturing device includes an imaging lens assembly (it reference numeral is omitted) and an image sensor 770. The imaging lens assembly includes, in order from an object side to an image side, a first lens element 710, an aperture stop 700, a second lens element 720, a third lens element 730, a fourth lens element 740, an IR-filter 750, and an image surface 760, wherein the image sensor 770 is located at the image surface 760 of the imaging lens assembly. The imaging lens assembly has a total of four lens elements (710-740) with refractive power, and there is an air gap between every two of the first lens element 710, the second lens element 720, the third lens element 730, and the fourth lens element 740 that are adjacent to each other.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with negative refractive power has an object-side surface 721 being concave in a paraxial region thereof and an image-side surface 722 being convex in a paraxial region thereof. The second lens element is made of plastic material and has the object-side surface 721 and the image-side surface 722 being both aspheric. The object-side surface 721 of the second lens element 720 has at least one convex shape in an off-axis region thereof.

The third lens element 730 with positive refractive power has an object-side surface 731 being concave in a paraxial region and image-side surface 732 being convex in a paraxial region. The third lens element 730 is made of plastic material and has the object-side surface 731 and the image-side surface 732 being both aspheric.

The forth lens element 740 with negative refractive power has an object-side surface 741 being concave in a paraxial region and an image-side surface 742 being concave in a paraxial region thereof. The fourth lens element 740 is made of plastic material and has the object-side surface 741 and the image-side surface 742 being both aspheric. The image-side surface 742 of the fourth lens element 740 has at least one convex shape in an off-axis region thereof, and the largest distance between every two adjacent lens elements among all the lens elements (710-740) with refractive power is a distance between the third lens element 730 and the fourth lens element 740.

The IR-filter 750 is made of glass material and located between the fourth lens element 740 and the image surface 760, and will not affect a focal length of the imaging lens assembly.

The detailed optical data of the 7th embodiment are shown in Table 13 and the aspheric surface data are shown in Table 14 below.

TABLE 13

7th Embodiment
f = 5.98 mm, Fno = 2.75, HFOV = 17.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.681 | ASP | 0.669 | Plastic | 1.544 | 55.9 | 3.19 |
| 2 | | 44.326 | ASP | 0.124 | | | | |
| 3 | Ape. Stop | Plano | | 0.035 | | | | |
| 4 | Lens 2 | −2.390 | ASP | 0.250 | Plastic | 1.650 | 21.4 | −4.97 |
| 5 | | −9.554 | ASP | 0.825 | | | | |
| 6 | Lens 3 | −9.923 | ASP | 0.435 | Plastic | 1.583 | 30.2 | 8.58 |
| 7 | | −3.381 | ASP | 1.833 | | | | |
| 8 | Lens 4 | −3.106 | ASP | 0.287 | Plastic | 1.544 | 55.9 | −4.60 |
| 9 | | 13.330 | ASP | 0.329 | | | | |
| 10 | IR-filter | Plano | | 0.520 | Glass | 1.517 | 64.2 | — |
| 11 | | Plano | | 0.598 | | | | |
| 12 | Image | Plano | | — | | | | |

Note:
Reference wavelength is 587.6 nm (d-line)

TABLE 14

Aspheric Coefficients

| Surface # | 1 | 2 | 4 | 5 |
|---|---|---|---|---|
| k = | −1.0568E+00 | 9.0000E+01 | −7.6638E+00 | 3.5000E+00 |
| A4 = | 3.2176E−02 | 5.7163E−02 | 3.2168E−01 | 3.6899E−01 |
| A6 = | 3.8264E−03 | −1.2024E−02 | −3.2787E−01 | −2.6372E−01 |
| A8 = | −6.9360E−04 | −1.9149E−02 | 2.6446E−01 | 1.9476E−01 |
| A10 = | 2.5023E−03 | 5.2255E−03 | −1.4723E−01 | −5.9266E−02 |
| A12 = | −1.6823E−03 | 2.4580E−03 | 4.0998E−02 | −3.7892E−03 |
| A14 = | | | | 1.2019E−02 |

| Surface # | 6 | 7 | 8 | 9 |
|---|---|---|---|---|
| k = | 2.3262E+00 | 2.8531E+00 | −4.5432E+00 | 7.6497E+01 |
| A4 = | 1.3095E−02 | −2.5111E−03 | −1.8567E−01 | −1.3895E−01 |
| A6 = | −3.3437E−02 | −1.3837E−02 | 7.6961E−02 | 8.0416E−02 |
| A8 = | 1.2089E−02 | −2.0809E−03 | −2.3167E−02 | −2.9361E−02 |
| A10 = | −3.5038E−03 | 2.6804E−03 | −2.7796E−03 | 3.6932E−03 |
| A12 = | 5.0960E−03 | 1.6294E−03 | 7.4639E−03 | 1.7858E−03 |
| A14 = | −4.4134E−03 | −2.4673E−03 | −2.4913E−03 | −6.4015E−04 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 5.98 | (R3 + R4)/(R3 − R4) | −1.67 |
| Fno | 2.75 | \|f/f1\| + \|f/f2\| + \|f/f3\| + \|f/f4\| | 5.07 |
| HFOV [deg.] | 17.1 | (f/R1) − (f/R2) + ((f*CT1)/(R1*R2)) | 3.48 |
| Nmax | 1.650 | ΣCT/TD | 0.37 |
| V2 + V3 | 51.6 | Y11/Y42 | 0.83 |
| CT1/CT2 | 2.68 | tan(2*HFOV) | 0.68 |
| T12/CT2 | 0.64 | SD/TD | 0.82 |
| T12/(T23 + T34) | 0.06 | EPD/ImgH | 1.12 |
| (T23 + T34)/CT3 | 6.11 | TL [mm] | 5.91 |
| R1/R2 | 0.04 | f/TL | 1.01 |
| R3/T23 | −2.90 | f/ImgH | 3.07 |
| f/R1 | 3.56 | TL/ImgH | 3.03 |

8th Embodiment

Figure 15:
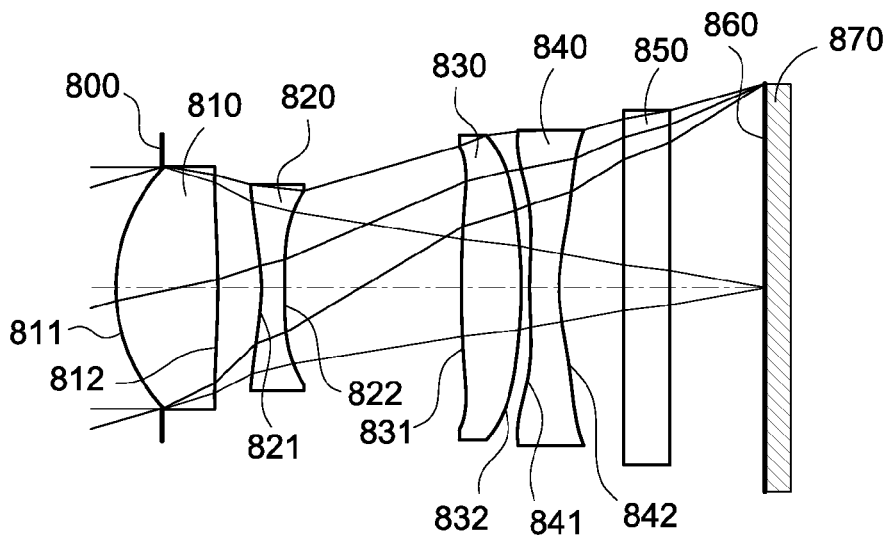
FIG. 15 is a schematic view of an image capturing device according to the 8th embodiment of the present disclosure.
Figure 16:
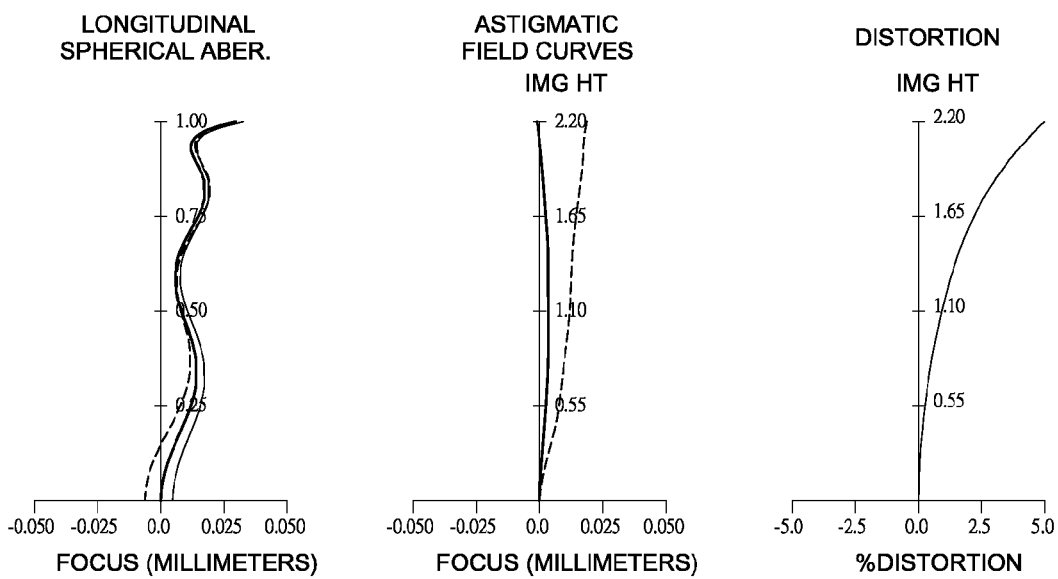
FIG. 16 shows spherical aberration curves, astigmatic field curves, and a distortion curve of the image capturing device according to the 8th embodiment.

FIG. 15 is a schematic view of an image capturing device according to 8th embodiment of the present invention. FIG. 16 shows spherical aberration curves, astigmatic field curves, and a distortion curve of the image capturing device according to the 8th embodiment. In FIG. 15, the image capturing device includes an imaging lens assembly (it reference numeral is omitted) and an image sensor 870. The imaging lens assembly includes, in order from an object side to an image side, an aperture stop 800, a first lens element 810, a second lens element 820, a third lens element 830, a fourth lens element 840, an IR-filter 850, and an image surface 860, wherein the image sensor 870 is located at the image surface 860 of the imaging lens assembly. The imaging lens assembly has a total of four lens elements (810-840) with refractive power, and there is an air gap between every two of the first lens element 810, the second lens element 820, the third lens element 830, and the fourth lens element 840 that are adjacent to each other.

The first lens element 810 with positive power has an object-side surface 811 being convex in a paraxial region and an image-side surface 812 being convex in a paraxial region thereof. The first lens element 810 is made of plastic material and has the object-side surface 811 and the image-side surface 812 being both aspheric.

The second lens element 820 with negative refractive power has an object-side surface 821 being concave in a paraxial region and an image-side surface 822 being convex in a paraxial region thereof. The second lens element 820 is made of plastic material and the object-side surface 821 and the image-side surface 822 being both aspheric. The object-side surface 821 of the second lens element 820 has at least one convex shape in an off-axis region thereof.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric. The largest distance between every two adjacent lens elements among all the lens elements (810-840) with refractive power is a distance between the second lens element 820 and the third lens element 830.

The fourth lens element 840 with negative refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric. The image-side surface 842 of the fourth lens element 840 has at least one convex shape in an off-axis region thereof.

The IR-filter 850 is made of glass material and located between the fourth lens element 840 and the image surface 860, and will not affect a focal length of the imaging lens assembly.

The detailed optical data of the 8th embodiment are shown in Table 15 and the aspheric surface data are shown in Table 16 below.

TABLE 15

8th Embodiment
f = 7.31 mm, Fno = 2.80, HFOV = 16.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.500 | | | | |
| 2 | Lens 1 | 1.895 | ASP | 1.100 | Plastic | 1.535 | 55.7 | 3.09 |
| 3 | | −10.413 | ASP | 0.475 | | | | |
| 4 | Lens 2 | −1.996 | ASP | 0.250 | Plastic | 1.640 | 23.3 | −3.20 |
| 5 | | −85.758 | ASP | 1.910 | | | | |
| 6 | Lens 3 | 16.870 | ASP | 0.645 | Plastic | 1.639 | 23.5 | 5.69 |
| 7 | | −4.565 | ASP | 0.088 | | | | |
| 8 | Lens 4 | 4.963 | ASP | 0.318 | Plastic | 1.535 | 55.7 | −5.53 |
| 9 | | 1.812 | ASP | 0.700 | | | | |
| 10 | IR-filter | Plano | | 0.500 | Glass | 1.517 | 64.2 | — |
| 11 | | Plano | | 1.018 | | | | |
| 12 | Image | Plano | | — | | | | |

Note:
Reference wavelength is 587.6 nm (d-line)

TABLE 16

Aspheric Coefficients

| Surface # | 2 | 3 | 4 | 5 |
|---|---|---|---|---|
| k = | −1.5355E+00 | −3.4244E+00 | 3.9397E−02 | 9.0000E+01 |
| A4 = | 2.6744E−02 | 1.8138E−02 | 3.4935E−01 | 3.3028E−01 |
| A6 = | 3.1043E−03 | 7.2859E−04 | −3.5869E−01 | −2.8335E−01 |
| A8 = | −6.4874E−04 | −2.4706E−03 | 2.7922E−01 | 1.8955E−01 |
| A10 = | 6.6990E−04 | 1.0979E−03 | −1.3077E−01 | −4.7592E−02 |
| A12 = | −2.2534E−05 | −1.7847E−04 | 2.6017E−02 | −1.5281E−02 |
| A14 = | | | | 1.0122E−02 |

| Surface # | 6 | 7 | 8 | 9 |
|---|---|---|---|---|
| k = | 4.5847E+01 | −5.8288E+01 | −7.9846E+01 | −1.1146E+01 |
| A4 = | 2.9383E−02 | −7.3131E−03 | −1.2576E−01 | −8.4191E−02 |
| A6 = | −2.5609E−02 | −3.6647E−03 | 3.1763E−02 | 3.2044E−02 |
| A8 = | 1.0324E−02 | −6.6590E−03 | 5.3728E−03 | 2.9447E−04 |
| A10 = | −5.9882E−03 | 3.0222E−03 | −2.3630E−03 | −1.8420E−03 |
| A12 = | 1.4909E−03 | −4.7542E−04 | 2.3569E−04 | 2.7302E−04 |
| A14 = | −1.7228E−04 | 6.9226E−06 | −6.0119E−06 | 3.9778E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 7.31 | (R3 + R4)/(R3 − R4) | −1.05 |
| Fno | 2.80 | \|f/f1\| + \|f/f2\| + \|f/f3\| + \|f/f4\| | 7.25 |
| HFOV [deg.] | 16.0 | (f/R1) − (f/R2) + ((f*CT1)/(R1*R2)) | 4.15 |
| Nmax | 1.640 | ΣCT/TD | 0.48 |
| V2 + V3 | 46.8 | Y11/Y42 | 0.77 |
| CT1/CT2 | 4.40 | tan(2*HFOV) | 0.62 |
| T12/CT2 | 1.90 | SD/TD | 0.90 |
| T12/(T23 + T34) | 0.24 | EPD/ImgH | 1.18 |
| (T23 + T34)/CT3 | 3.10 | TL [mm] | 7.00 |
| R1/R2 | −0.18 | f/TL | 1.04 |
| R3/T23 | −1.05 | f/ImgH | 3.32 |
| f/R1 | 3.86 | TL/ImgH | 3.18 |

9th Embodiment

Figure 17:
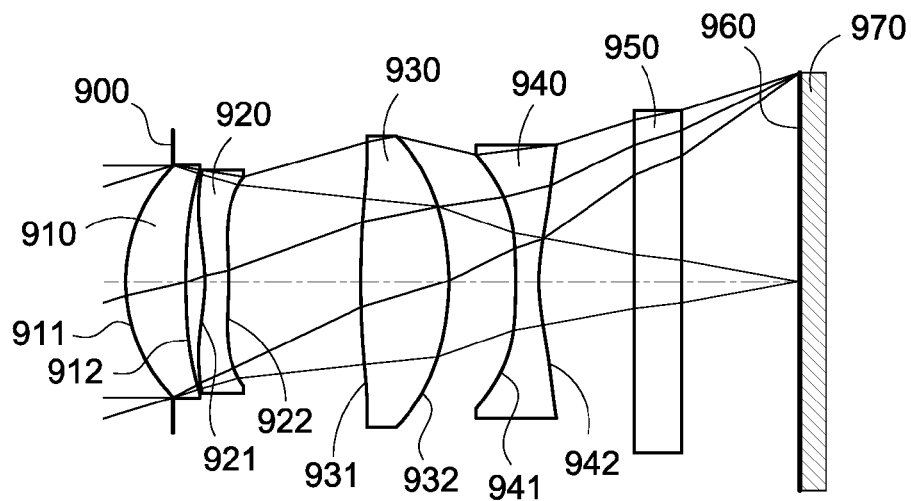
FIG. 17 is a schematic view of an image capturing device according to the 9th embodiment of the present disclosure.
Figure 18:
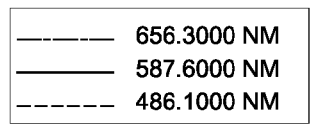
FIG. 18 shows spherical aberration curves, astigmatic field curves, and a distortion curve of the image capturing device according to the 9th embodiment.
Figure 18:
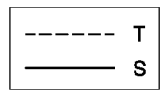
Figure 18:
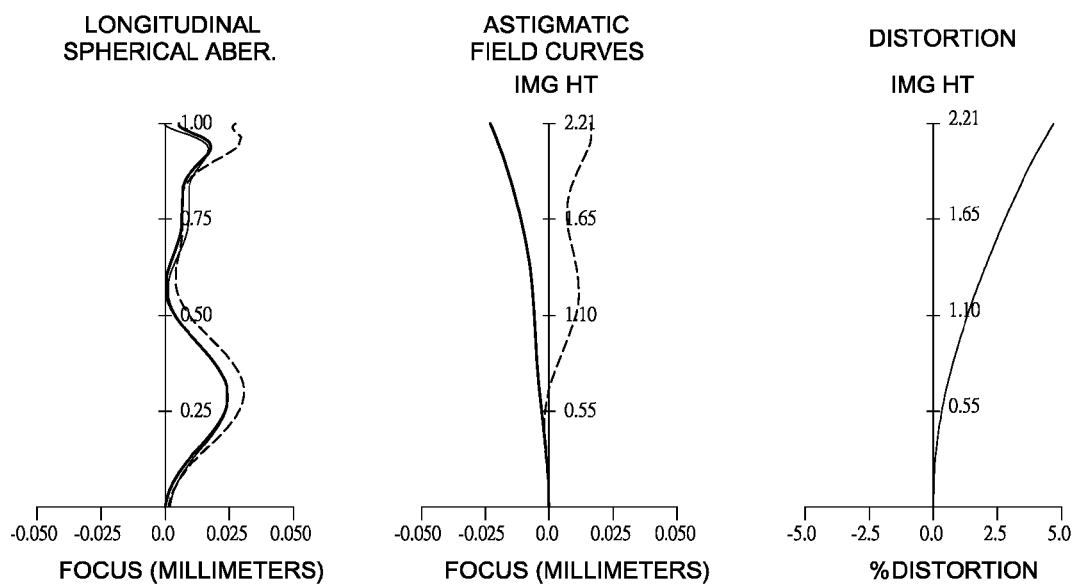

FIG. 17 is a schematic view of an image capturing device according to 9th embodiment of the present invention. FIG. 18 shows spherical aberration curves, astigmatic field curves, and a distortion curve of the image capturing device according to the 9th embodiment. In FIG. 17, the image capturing device includes an imaging lens assembly (it reference numeral is omitted) and an image sensor 970. The imaging lens assembly includes, in order from an object side to an image side, an aperture stop 900, a first lens element 910, a second lens element 920, a third lens element 930, a fourth lens element 940, an IR-filter 950, and an image surface 960. The imaging lens assembly has a total of four lens elements (910-940) with refractive power, and there is an air gap between every two of the first lens element 910, the second lens element 920, the third lens element 930, and the fourth lens element 940 that are adjacent to each other.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric.

The second lens element 920 with negative refractive power has an object-side surface 921 being concave in a paraxial region and an image-side surface 022 being convex in a paraxial region thereof. The second lens element 920 is made of plastic material and has the object-side surface 921 and the image-side surface 922 being both aspheric. The object-side surface 921 of the second lens element 920 has at least one convex shape in an off-axis region thereof.

The third lens element 930 with positive refractive power has an object-side surface 931 being convex in a paraxial region thereof and an image-side surface 932 being convex in a paraxial region thereof. The third lens element 930 is made of plastic material and has the object-side surface 931 and the image-side surface 932 being both aspheric. The largest distance between every two adjacent lens elements among all the lens elements (910-940) with refractive power is a distance between the second lens element 920 and the third lens element 930.

The fourth lens element 940 with negative refractive power has an object-side surface 941 being concave in a paraxial region and an image-side surface 942 being concave in a paraxial region thereof. The fourth lens element 940 is made of plastic material and has the object-side surface 941 and the image-side surface 942 being both aspheric. The image-side surface 942 of the fourth lens element 940 has at least one convex shape in an off-axis region thereof.

The IR-filter 950 is made of glass material and located between the fourth lens element 940 and the image surface 960, and will not affect a focal length of the imaging lens assembly.

The detailed optical data of the 9th embodiment are shown in Table 17 and the aspheric surface data are shown in Table 18 below.

TABLE 17

9th Embodiment
f = 6.86 mm, Fno = 2.80, HFOV = 17.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.495 | | | | |
| 2 | Lens 1 | 1.817 ASP | 0.636 | Plastic | 1.535 | 55.7 | 3.92 |
| 3 | | 11.899 ASP | 0.197 | | | | |
| 4 | Lens 2 | −1.850 ASP | 0.250 | Plastic | 1.640 | 23.3 | −5.98 |
| 5 | | −3.767 ASP | 1.398 | | | | |
| 6 | Lens 3 | 13.581 ASP | 0.928 | Plastic | 1.535 | 55.7 | 4.16 |
| 7 | | −2.597 ASP | 0.702 | | | | |
| 8 | Lens 4 | −13.130 ASP | 0.250 | Plastic | 1.535 | 55.7 | −3.32 |
| 9 | | 2.066 ASP | 1.000 | | | | |
| 10 | IR-filter | Plano | 0.500 | Glass | 1.517 | 64.2 | — |
| 11 | | Plano | 1.250 | | | | |
| 12 | Image | Plano | — | | | | |

Note:
Reference wavelength is 587.6 nm (d-line)

TABLE 18

Aspheric Coefficients

| Surface # | 2 | 3 | 4 | 5 |
|---|---|---|---|---|
| k = | −1.1445E+00 | 8.8889E+01 | −3.7046E+00 | −4.6943E+00 |
| A4 = | 3.4257E−02 | 6.4341E−02 | 3.6507E−01 | 3.5967E−01 |
| A6 = | 3.9829E−03 | −1.9710E−02 | −3.5810E−01 | −2.6614E−01 |
| A8 = | −2.3829E−04 | −1.0935E−03 | 2.7330E−01 | 1.7221E−01 |
| A10 = | 6.5293E−04 | 1.3661E−03 | −1.3129E−01 | −4.6855E−02 |
| A12 = | 4.8127E−04 | −2.3479E−03 | 2.7048E−02 | −1.2068E−02 |
| A14 = | | | | 1.1066E−02 |

| Surface # | 6 | 7 | 8 | 9 |
|---|---|---|---|---|
| k = | 6.0996E+01 | −1.0292E+01 | 8.0887E+01 | −8.3010E+00 |
| A4 = | 3.2129E−02 | −3.6148E−02 | −1.7238E−01 | −9.5638E−02 |

TABLE 18-continued

| Aspheric Coefficients | | | | |
|---|---|---|---|---|
| A6 = | −3.1074E−02 | −1.8569E−03 | 3.6846E−02 | 4.0776E−02 |
| A8 = | 1.1470E−02 | −5.8362E−03 | 3.7379E−03 | −1.5789E−03 |
| A10 = | −5.3691E−03 | 3.1400E−03 | −1.7780E−03 | −2.6279E−03 |
| A12 = | 1.5994E−03 | −4.6275E−04 | 7.3595E−04 | 3.0328E−04 |
| A14 = | −1.6732E−04 | −2.3006E−06 | 7.8475E−06 | 9.3600E−05 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| Embodiment 9 | | | |
|---|---|---|---|
| f [mm] | 6.86 | (R3 + R4)/(R3 − R4) | −2.93 |
| Fno | 2.80 | \|f/f1\| + \|f/f2\| + \|f/f3\| + \|f/f4\| | 6.61 |
| HFOV [deg.] | 17.0 | (f/R1) − (f/R2) + ((f*CT1)/(R1*R2)) | 3.40 |
| Nmax | 1.640 | ΣCT/TD | 0.47 |
| V2 + V3 | 79.0 | Y11/Y42 | 0.85 |
| CT1/CT2 | 2.54 | tan(2*HFOV) | 0.68 |
| T12/CT2 | 0.79 | SD/TD | 0.89 |
| T12/(T23 + T34) | 0.09 | EPD/ImgH | 1.11 |
| (T23 + T34)/CT | 2.26 | TL [mm] | 7.11 |
| R1/R2 | 0.15 | f/TL | 0.97 |
| R3/T23 | −1.32 | f/ImgH | 3.11 |
| f/R1 | 3.78 | TL/ImgH | 3.23 |

10th Embodiment

Figure 19:
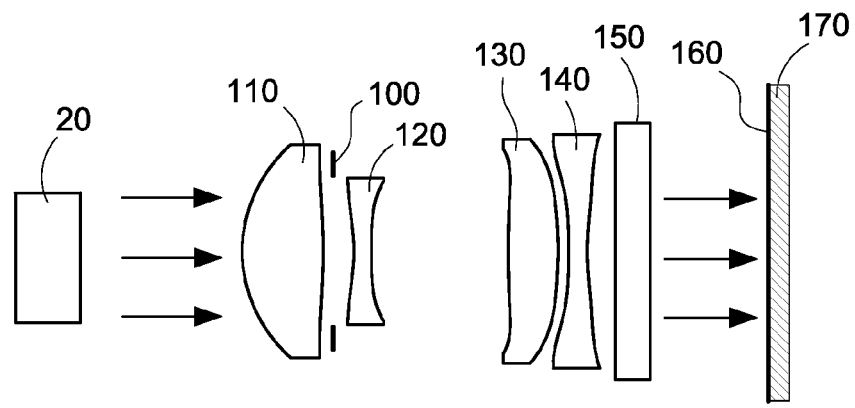
FIG. 19 is a schematic view of an image capturing device according to the 10th embodiment of the present disclosure.

FIG. 19 is a schematic view of an image capturing device according to the 10th embodiment of the present disclosure. In FIG. 19, the image capturing device includes the imaging lens assembly (its reference numeral is omitted) according to the present disclosure and the image sensor 170. It should be noted that the imaging lens assembly and the image sensor 170 shown in the FIG. 19 are the same as aforementioned in the 1st embodiment, and the same reference numbers are used in the drawing and the description to refer to the same parts. In practical applications, the imaging lens assembly and the image sensor can be one of the imaging lens assemblies and image sensors aforementioned in the 2nd to 9th embodiment.

The imaging lens assembly is located between an imaged object 20 and the image sensor 170, and the image sensor 170 is located at the image surface 150 of the imaging lens assembly. The imaging lens assembly is configured to image the imaged object 20 on the image sensor 170 located at the image surface 160.

11th Embodiment

Figure 20:
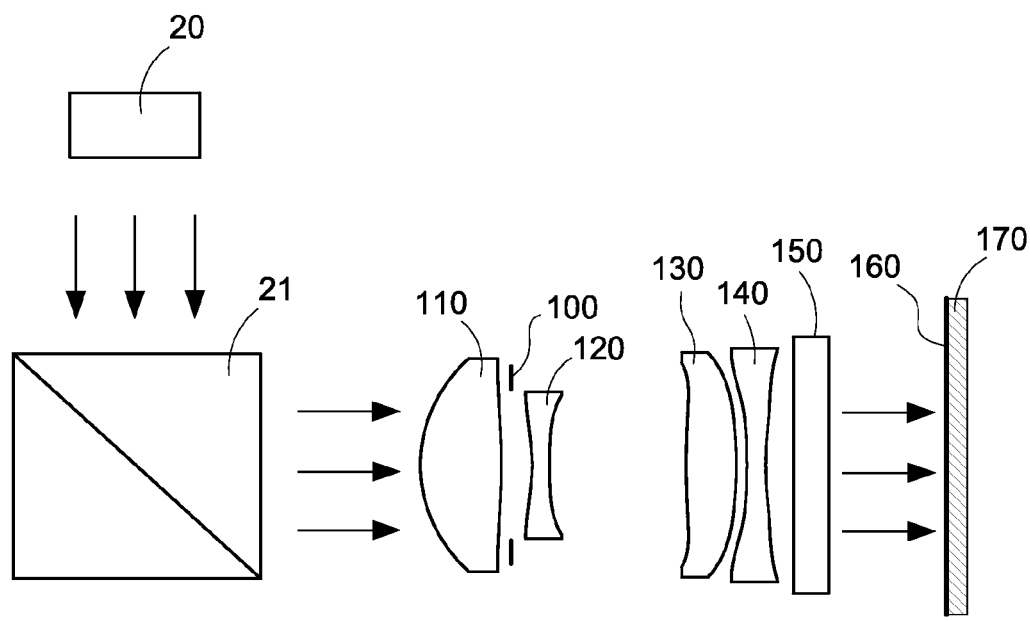
FIG. 20 is a schematic view of an image capturing device according to the 11th embodiment of the present disclosure.

FIG. 20 is a schematic view of an image capturing device according to the 11th embodiment of the present disclosure. In FIG. 20, the image capturing device includes the imaging lens assembly (its reference numeral is omitted) according to the present disclosure, a prism 21, and the image sensor 170. It should be noted that the imaging lens assembly and the image sensor 170 shown in the FIG. 20 are the same as aforementioned in the 1st embodiment, and the same reference numbers are used in the drawing and the description to refer to the same parts. In practical applications, the imaging lens assembly and the image sensor can be one of the imaging lens assemblies and image sensors aforementioned in the 2nd to 9th embodiment.

The imaging lens assembly is located between an imaged object 20 and the image sensor 170, the image sensor 170 is located at the image surface 160 of the imaging lens assembly, and the prism 21 is located between the image object and the imaging lens assembly. The imaging lens assembly is configured to image the imaged object 20 on the image sensor 170 located at the image surface 160. The prism 21 has a function of redirecting light at a designed angle, so that the imaged capturing device has a flexible space allocation since the height of the image capturing device is reduced, and the image capturing device can be employed in compact electronic devices.

12th Embodiment

Figure 21:
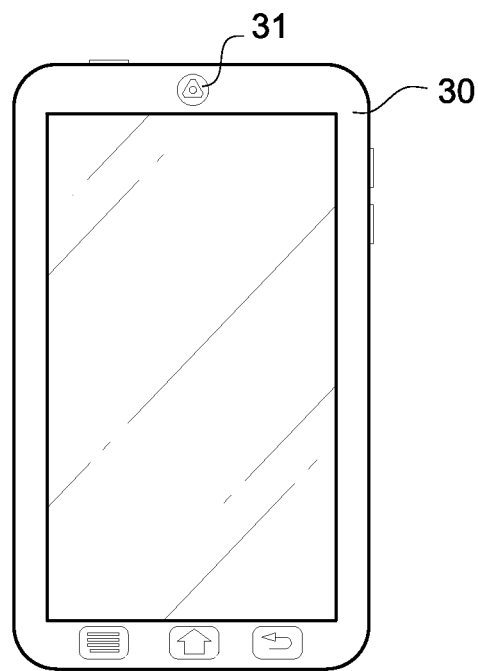
FIG. 21 is a schematic view of an electronic device according to the 12th embodiment of the present disclosure.

FIG. 21 is a schematic view of an electronic device according to the 12th embodiment of the present disclosure. The electronic device 30 of the 12th embodiment is a smart phone, wherein the electronic device 30 includes an image capturing device 31. The image capturing device 31 includes an imaging lens assembly (not otherwise herein labeled) according to the present disclosure and an image sensor (not otherwise herein labeled), wherein the image sensor is located at an image side of the imaging lens assembly.

13th Embodiment

Figure 22:
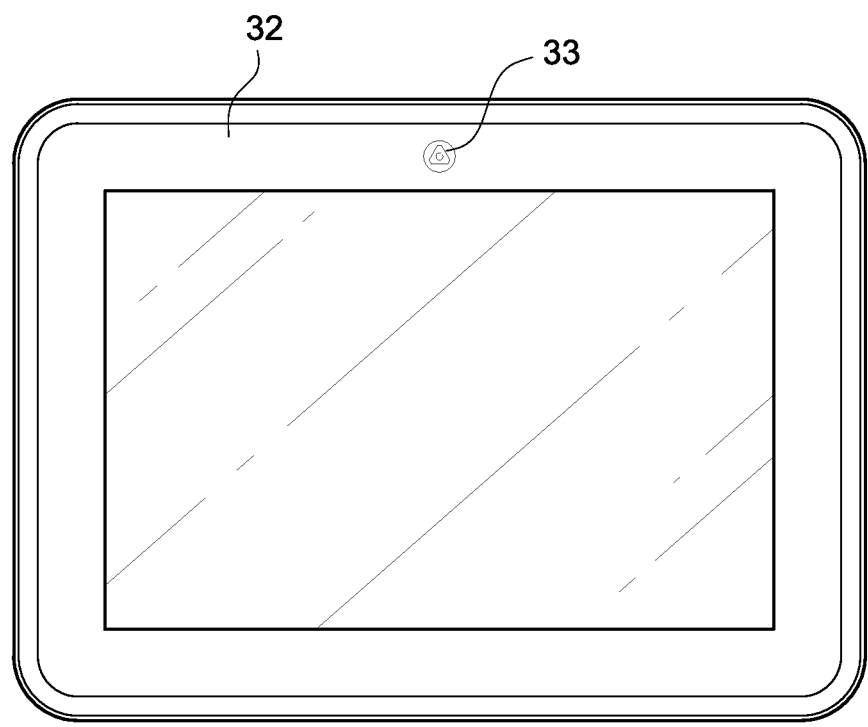
FIG. 22 is a schematic view of an electronic device according to the 13th embodiment of the present disclosure.

FIG. 22 is a schematic view of an electronic device according to the 13th embodiment of the present disclosure. The electronic device 32 of the 13th embodiment is a tablet personal computer, wherein the electronic device 32 includes an image capturing device 33. The image capturing device 33 includes an imaging lens assembly (not otherwise herein labeled) according to the present disclosure and an image sensor (not otherwise herein labeled), wherein the image sensor is located at an image side of the imaging lens assembly.

14th Embodiment

Figure 23:
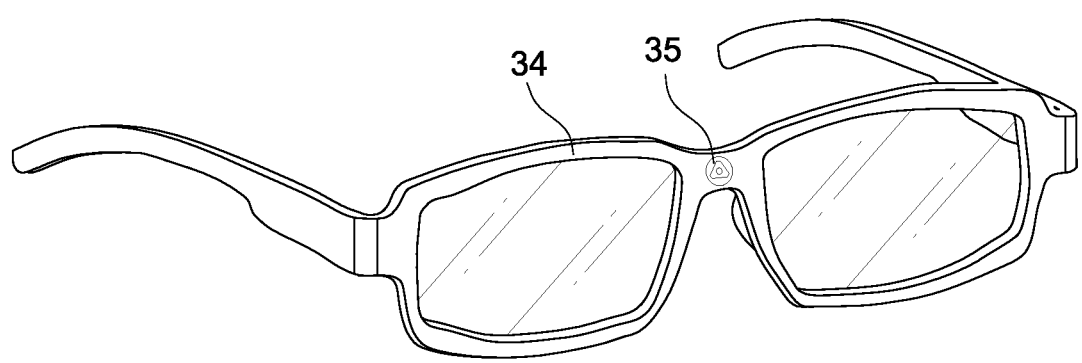
FIG. 23 is a schematic view of an electronic device according to the 14th embodiment of the present disclosure.
Figure 1:
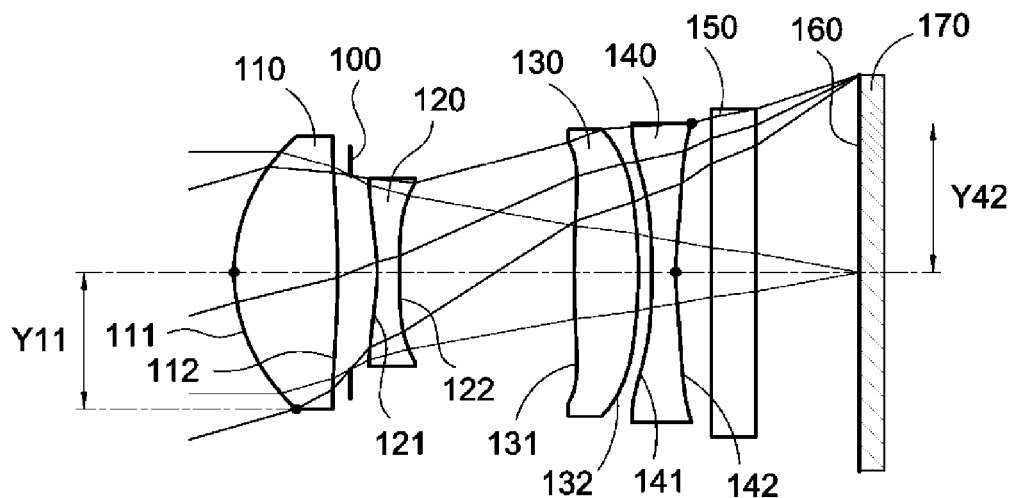
Figure 2:
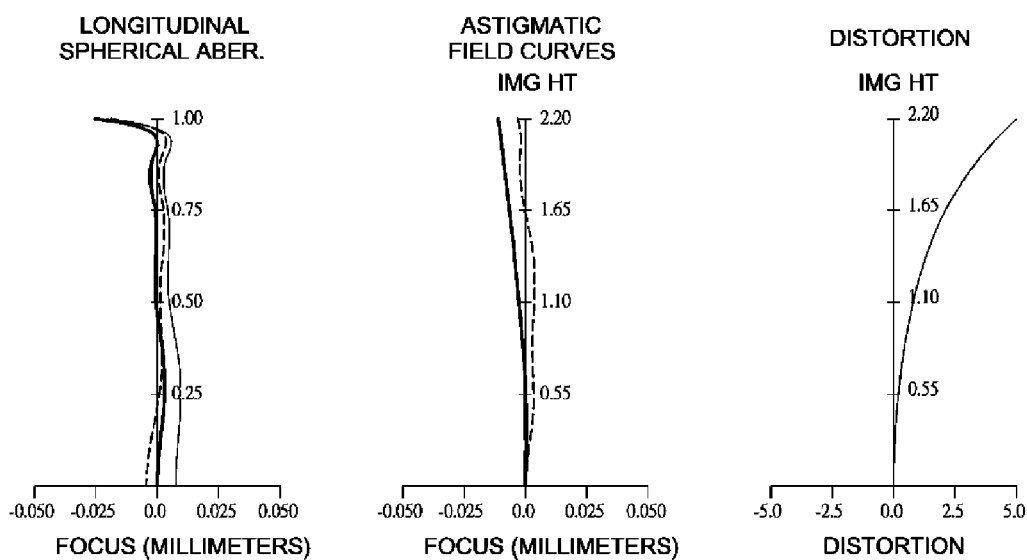

FIG. 23 is a schematic view of an electronic device according to the 13th embodiment of the present disclosure. The electronic device 34 of the 14th embodiment is a head-mounted display (HMD), wherein the electronic device 34 includes an image capturing device 35. The image capturing device 35 includes an imaging lens assembly (not otherwise herein labeled) according to the present disclosure and an image sensor (not otherwise herein labeled), wherein the image sensor is located at an image side of the imaging lens assembly.

The foregoing description, for purpose of explanation, has been described with reference to specific embodiments. It is to be noted that Tables 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly comprising, in order from an object side to an image side:
    a first lens element with positive refractive power having an object-side surface being convex in a paraxial region thereof;
    a second lens element with negative refractive power having an object-side surface being concave in a paraxial region thereof;
    a third lens element with positive refractive power having an object-side surface and an image-side surface being aspheric; and
    a fourth lens element with negative refractive power having an object-side surface and an image-side surface being aspheric;
    wherein the imaging lens assembly further comprises an aperture stop, wherein no lens element is disposed between the aperture stop and the first lens element; the imaging lens assembly has a total of four lens elements, there is an air gap between every two of the first lens element, the second lens element, the third lens element, and the fourth lens element that are adjacent to each other, a curvature radius of the object-side surface of the second lens element is R3, a curvature radius of an image-side surface of the second lens element is R4, a focal length of the imaging lens assembly is f, a maximum image height of the imaging lens assembly is ImgH, an axial distance between the first lens element and the second lens element is T12, an axial distance between the second lens element and the third lens element is T23, a central thickness of the second lens element is CT2, an axial distance between the object-side surface of the first lens element and an image surface is TL, and the following conditions are satisfied:

$(R3+R4)/(R3-R4)<0$;

$2.4<f/ImgH<6.5$;

$-4.0<R3/T23<0$;

$0.3<T12/CT2<5.0$; and $0.95<f/TL<1.5$.

2. The imaging lens assembly of claim 1, wherein the image-side surface of the third lens element being convex in a paraxial region thereof.

3. The imaging lens assembly of claim 1, wherein the fourth lens element has the image-side surface being concave in a paraxial region thereof and at least one convex shape on the image-side surface in an off-axis region thereof.

4. The imaging lens assembly of claim 1, wherein the third lens element has the object-side surface being convex in a paraxial region thereof.

5. The imaging lens assembly of claim 1, wherein the fourth lens element has the object-side surface being concave in a paraxial region thereof.

6. The imaging lens assembly of claim 1, wherein the second lens element has the image-side surface being convex in a paraxial region thereof.

7. The imaging lens assembly of claim 1, wherein the curvature radius of the object-side surface of the second lens element is R3, the curvature radius of the image-side surface of the second lens element is R4, and a maximum refractive index among the first lens element, the second lens element, the third lens element and the fourth lens element is Nmax, the following conditions are satisfied:

$|R3|<|R4|$; and $1.50<Nmax<1.70$.

8. The imaging lens assembly of claim 1, wherein the focal length of the imaging lens assembly is f, a curvature radius of the object-side surface of the first lens element is R1, and the following condition is satisfied:

$3.3<f/R1<8.5$.

9. The imaging lens assembly of claim 1, wherein the focal length of the imaging lens assembly is f, and the following condition is satisfied:

$5.5\ mm<f<12.0\ mm$.

10. The imaging lens assembly of claim 1, wherein the axial distance between the first lens element and the second lens element is T12, and the central thickness of the second lens element is CT2, and the following condition is satisfied:

$0.4<T12/CT2<3.0$.

11. The imaging lens assembly of claim 1, wherein the focal length of the imaging lens assembly is f, a focal length of the first lens element is f1, a focal length of the second lens element is f2, a focal length of the third lens element is f3, a focal length of the fourth lens element is f4, and the following condition is satisfied:

$5.0<|f/f1|+|f/f2|+|f/f3|+|f/f4|$.

12. The imaging lens assembly of claim 1, wherein the second lens element has at least one convex shape on the object-side surface in an off-axis region thereof, a sum of central thicknesses of the first lens element, the second lens element, the third lens element, and the fourth lens element is ΣCT, an axial distance between the object-side surface of the first lens element and the image-side surface of the fourth lens element is TD, and the following condition is satisfied:

$\Sigma CT/TD<0.55$.

13. The imaging lens element of claim 1, wherein at least one inflection point is positioned on at least one surface of the second lens element, the third lens element, or the fourth lens element, an axial distance between the aperture stop and the image-side surface of the fourth lens element is SD, an axial distance between the object-side surface of the first lens element and the image-side surface of the fourth lens element is TD, and the following condition is satisfied:

$0.65<SD/TD<1.0$.

14. The imaging lens assembly of claim 1, wherein an entrance pupil diameter of the imaging lens assembly is EPD, a maximum image height of the imaging lens assembly is ImgH, and the following condition is satisfied;

$0.9<EPD/ImgH<2.0$.

15. An imaging lens assembly comprising, in order from an object-side to an image-side:
    a first lens element with positive refractive power having an object-side surface being convex in a paraxial region thereof;
    a second lens element with negative refractive power having an object-side surface being concave in a paraxial region thereof;

a third lens element with positive refractive power having an object-side surface and an image-side surface being aspheric; and a fourth lens element with negative refractive power having an object-side surface and an imaging-side surface being aspheric;

wherein the imaging lens assembly further comprises an aperture stop, wherein no lens element is disposed between the aperture stop and the first lens element; the imaging lens assembly has a total of four lens elements, there is an air gap between every two of the first lens element, the second lens element, the third lens element, and the fourth lens element that are adjacent to each other, a curvature radius of the object-side surface of the first lens element is R1, a curvature radius of an image-side surface of the first lens element is R2, a curvature radius of the object-side surface of the second lens element is R3, a curvature radius of an image-side surface of the second lens element is R4, a focal length of the imaging lens assembly is f, a maximum image height of the imaging lens assembly is ImgH, a central thickness of the first lens element is CT1, and the following conditions are satisfied:

$(R3+R4)/(R3-R4)<0$;

$2.4<f/ImgH<6.5$;

$-0.50<R1/R2<0.50$; and $3.0<(f/R1)-(f/R2)+((f*CT1)/(R1*R2))<7.5$.

16. The imaging lens assembly of claim 15, wherein the third lens element has the object-side surface being concave in a paraxial region thereof.

17. The imaging lens element of claim 15, wherein the fourth lens element has the object-side surface being convex in a paraxial region thereof and the image-side surface being concave in a paraxial region thereof, and at least one convex shape on the image-side surface in an off-axis region thereof.

18. The imaging lens element of claim 15, wherein a half of maximum field of view of the imaging lens assembly is HFOV, and the following condition is satisfied:

$0.20<\tan(2*HFOV)<0.90$.

19. The imaging lens assembly of claim 15, wherein the first lens element, the second lens element, the third lens element, and the fourth lens element are made of plastic material, an Abbe number of the second lens element is V2, an Abbe number of the third lens element is V3, and the following condition is satisfied:

$20<V2+V3<60$.

20. The imaging lens assembly of claim 15, wherein the curvature radius of the object-side surface of the second lens element is R3, the curvature radius of the image-side surface of the second lens element is R4, and an axial distance between the object-side surface of the first lens element and an image surface is TL, and the following conditions are satisfied:

$|R3|<|R4|$; and $TL<10.0$ mm.

21. The imaging lens assembly of claim 15, wherein the focal length of the imaging lens assembly is f, and the maximum image height of the imaging lens assembly is ImgH, and the following condition is satisfied:

$2.7<f/ImgH<5.0$.

22. The imaging lens assembly of claim 15, wherein the curvature radius of the object-side surface of the first lens element is R1, the curvature radius of the image-side surface of the first lens element is R2, an axial distance between the first lens element and the second lens element is T12, an axial distance between the second lens element and the third lens element is T23, an axial distance between the third lens element and the fourth lens element is T34, and the following conditions are satisfied:

$-0.30<R1/R2<0.30$; and $0<T12/(T23+T34)<0.60$.

23. The imaging lens assembly of claim 15, wherein the focal length of the imaging lens assembly is f, the curvature radius of the object-side surface of the first lens element is R1, the central thickness of the first lens element is CT1, a central thickness of the second lens element is CT2, and the following conditions are satisfied:

$3.3<f/R1<8.5$; and $1.7<CT1/CT2<8.0$.

24. The imaging lens assembly of claim 15, wherein at least one inflection point is positioned on at least one surface of the third lens element or the fourth lens element, an axial distance between the object-side surface of the first lens element and an image surface is TL, a maximum image height of the imaging lens assembly is ImgH, and the following condition is satisfied:

$2.5<TL/ImgH<4.0$.

25. The imaging lens assembly of claim 15, wherein the object-side surface of the second lens element has at least one convex shape in an off-axis region thereof, an effective radius of the object-side surface of the first lens element is Y11, and an effective radius of the image-side surface of the fourth lens element is Y42, and the following condition is satisfied:

$0.7<Y11/Y42<1.8$.

26. The imaging lens assembly of claim 15, wherein a largest distance between every two adjacent lens elements among all the lens elements is a distance between the second lens element and the third lens element, an axial distance between the second lens element and the third lens element is T23, an axial distance between the third lens element and the fourth lens element is T34, a central thickness of the third lens element is CT3, and the following condition is satisfied:

$2.50<(T23+T34)/CT3$.

27. The imaging lens assembly of claim 15, wherein a largest distance between every two adjacent lens elements among all the lens elements is a distance between the third lens element and the fourth lens element.

28. An image capturing device comprising:
   the imaging lens assembly of claim 15; and
   an image sensor.

29. An electronic device comprising:
   the image capturing device of claim 28.

* * * * *

UNITED STATES PATENT AND TRADEMARK OFFICE
CERTIFICATE OF CORRECTION

PATENT NO. : 9,753,254 B2  
APPLICATION NO. : 14/812304  
DATED : September 5, 2017  
INVENTOR(S) : Hsin-Hsuan Huang Page 1 of 2

It is certified that error appears in the above-identified patent and that said Letters Patent is hereby corrected as shown below:

In the Drawings

Replace FIG. 1 as shown on the attached drawing sheet 1 of 12.

Signed and Sealed this
Twenty-first Day of November, 2017

Joseph Matal
*Performing the Functions and Duties of the
Under Secretary of Commerce for Intellectual Property and
Director of the United States Patent and Trademark Office*